(12) United States Patent
Mains et al.

(10) Patent No.: US 7,007,476 B2
(45) Date of Patent: Mar. 7, 2006

(54) GAS TURBINE FUEL SYSTEM STAGING VALVES

(75) Inventors: Robert Thane Mains, Euclid, OH (US); Jeffrey R. Lehtinen, Concord, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 65 days.

(21) Appl. No.: 10/800,541

(22) Filed: Mar. 15, 2004

(65) Prior Publication Data

US 2004/0221580 A1 Nov. 11, 2004

Related U.S. Application Data

(60) Provisional application No. 60/462,797, filed on Apr. 11, 2003.

(51) Int. Cl.
*F02C 7/228* (2006.01)
*F02C 7/232* (2006.01)

(52) U.S. Cl. .............................. 60/734; 60/739; 60/746

(58) Field of Classification Search .................. 60/734, 60/739, 746, 747
See application file for complete search history.

(56) References Cited

U.S. PATENT DOCUMENTS

| | | | |
|---|---|---|---|
| 3,082,785 A | 3/1963 | Radway | |
| 3,410,304 A | 11/1968 | Paul, Jr. | |
| 4,172,469 A | 10/1979 | Boehringer | |
| 4,570,668 A | 2/1986 | Burke et al. | |
| 4,738,282 A | 4/1988 | Boehringer | |
| 4,825,649 A | 5/1989 | Donnelly et al. | |
| 4,967,791 A | 11/1990 | Sternberger | |
| 5,076,144 A | 12/1991 | Karakama et al. | |
| 5,448,882 A * | 9/1995 | Dyer et al. | 60/39.281 |
| 5,558,129 A | 9/1996 | Mayeux | |
| 5,848,525 A * | 12/1998 | Spencer | 60/739 |
| 6,158,208 A | 12/2000 | Hommema | |

OTHER PUBLICATIONS

U.S. Appl. No. 60/462,797, filed Apr. 11, 2003, Robert Thane Mains, Fuel System Staging Valve With High Pressure.

Parker Hannifin Corporation Microseal Check Valve brochure, Part No. 372720.

* cited by examiner

*Primary Examiner*—Ted Kim
(74) *Attorney, Agent, or Firm*—Joseph J. Pophal

(57) ABSTRACT

In a fuel injector circuit for a gas turbine engine, a fuel staging valve assembly for distributing fuel into multiple zones in the combustor, the staging valve assembly, including a pilot valve operatively interconnected with at least one main valve, having high pressure and no leak capabilities, which are used to open, close and modulate the mass flow rate volume of fuel within the fuel injection circuit, with the position of the normally-closed valve being controlled by the pressure difference between the nozzle fuel supply circuit and a separately supplied signal circuit. As long as the desired pressure differential is maintained, fuel flow may be modulated without affecting the position of the valve, with the valve seats and valve seals being so configured as to prevent fuel leakage into the downstream nozzle circuit under these conditions.

38 Claims, 15 Drawing Sheets

SHUT DOWN

MODE 1

MODE 2

MODE 3

MODE 4

GAS TURBINE FUEL SYSTEM STAGING VALVES

CROSS-REFERENCE TO RELATED CASES

The present application claims the benefit of the filing date of U.S. Provisional Application Ser. No. 60/462,797 filed Apr. 11, 2003, the disclosure of which is incorporated herein by reference.

FIELD OF THE INVENTION

The present invention generally relates to gas turbine engines, and more particularly, to fuel injectors for supplying fuel to nozzles in such engine combustion chambers wherein, for each nozzle, a fuel staging valve assembly, including an operatively interconnected pilot valve and at least one main valve, distribute fuel in a predetermined manner.

BACKGROUND OF THE INVENTION

Fuel injector assemblies are useful for applications such as gas turbine combustion engines for directing pressurized fuel from a manifold to one or more combustion chambers. Such assemblies also function to prepare the fuel for mixing with air prior to combustion. Each injector assembly typically has an inlet fitting connected the manifold, a tubular extension or stem connected at one end to the fitting in a typically cantilevered fashion, and one or more spray nozzles connected to the other end of the stem or housing for directing the fuel into the combustion chamber. A single or multiple fuel feed circuit(s) extend through the housing to supply fuel from the inlet fitting to the nozzle or nozzle assembly. Appropriate valves and/or fuel dividers, such as fuel system staging valves are generally provided to direct and control the fuel flow through the nozzle. The fuel provided by the injector(s) is mixed with air and ignited so that the expanding gases of combustion can, for example, move rapidly across and rotate engine blades in the gas turbine engine to provide power, for example, to an aircraft in a manner well known to those skilled in this art.

In a known prior art check valve, namely the Parker Hannifin Corporation Microseal check valve, Part Number 372720, that is designed for high-pressure hydraulic applications, the load on the hard seat metal valve seat increases as the supply pressure increases and also requires precise lapping of the opposed mating surfaces. A plurality of dynamic seals is required and moving parts of the valve are located downstream of the valve seat, all of which can have a negative effect upon both performance and longevity.

Attempted prior art solutions have been numerous, with some being set forth in the following patents: U.S. Pat. No. 3,082,304 to Radway; U.S. Pat. No. 3,410,304 to Paul, Jr.; U.S. Pat. No. 4,172,469 to Boehringer; U.S. Pat. No. 4,570,668 to Burke, et al.; U.S. Pat. No. 4,738,282; U.S. Pat. No. 4,825,649 to Donnelly, et al.; U.S. Pat. No. 4,967,791 to Stemberger; U.S. Pat. No. 5,076,144 to Karakama et al; U.S. Pat. No. 5,558,129 to Mayeux; and U.S. Pat. No. 6,158,208 to Hommema.

However, no single one or combination of these references either discloses or suggests all of the claimed features of the present invention.

SUMMARY OF THE PRESENT INVENTION

Accordingly, in order to overcome the deficiencies of the prior art devices, the present invention provides a device or structure in the form of a fuel staging valve, having high pressure and no leak capabilities, which are used to open, close and modulate the flow size of gas turbine engine fuel nozzle injection circuits.

The position of the normally-closed staging valve assembly is controlled by the pressure difference between the nozzle fuel supply circuit and a separately supplied signal circuit. As long as the desired pressure differential is maintained, fuel flow may be modulated without affecting the position of the valve assembly. During engine operation, the closed valve assembly, and particularly the main valve can be exposed to a wide range of fuel supply pressures. The valve seal and seat features of the present invention are configured to prevent fuel leakage into the downstream nozzle circuit under these conditions. This "No Leak" feature eliminates a fuel source that can contribute to combustor emissions and nozzle coking. Furthermore, this "No Leak" feature also prevents drainage of upstream fuel into the combustor at engine shutdown.

Specifically, one embodiment of this invention pertains to a fuel staging valve assembly, for distributing fuel flow to multiple zones of a nozzle or combustor in a gas turbine engine, including a pilot valve operatively interconnected with at least one main valve, the at least one main valve comprising a dual diameter valve housing; a dual diameter cylindrical valve sleeve fixedly, sealingly and conformably received within the valve housing, the sleeve having a first diameter portion and a second diameter portion joined via an intermediate annular portion, with a peripheral land cavity being located between the sleeve intermediate portion and an adjacent portion of the valve housing; and the first diameter portion having a peripheral, recessed, annular gland area with axially spaced first and second pluralities of discrete radial passages therethrough; a dual diameter hollow cylindrical valve spool, having a central cavity in communication with a source of fuel, conformably and slidably received within the cylindrical valve sleeve, the spool having a first diameter portion and a second diameter portion joined via an intermediate annular portion, with predetermined diametral clearance spaces being provided between corresponding adjoining first and second diameter portions of the sleeve and spool, thereby permitting a predetermined amount of fluid leakage therebetween, during operation of the pilot poppet valve; and an annular pressure signal cavity, interconnected with the land cavity, being located between intermediate annular portions of the valve sleeve and the valve spool; a centrally apertured spring retainer fixedly received within the sleeve first diameter portion and closing one end thereof; a main valve spring, interposed between the spring retainer and the spool intermediate annular portion, for preloading the spool against the sleeve; a centrally-apertured dual diameter valve seat retainer member having a first diameter portion and a second diameter portion joined via an intermediate radial surface portion, the retainer member first diameter portion being fixedly and sealingly received within an open end of the sleeve second diameter portion, with the retainer member intermediate radial surface portion being provided with an inwardly-directed, raised, central contoured seal seat portion adjoining the retainer member second diameter portion; a generally cup-shaped closure member is fixedly and sealingly received on the retainer member second diameter portion and includes a central main valve discharge orifice adapted to be operatively interconnected with the nozzle; a multiple diameter poppet member having interconnected first, second and third diameter portions, the first diameter portion being yieldingly, slidably received within an open end of the valve spool second diameter portion, with the axial movement of the poppet member being restricted via a split retaining roll pin press-fitted relative to the valve spool second diameter portion but having a predetermined peripheral clearance relative to the poppet member; a poppet spring, operatively interposed between the poppet member and a peripheral internal wall portion in the spool member second diameter portion, for axially biasing the poppet member toward the contoured seal seat portion, with the biasing being limited via the predetermined axial clearance, relative to the roll pin; a stiff, elastic, annular seal member, contoured in cross-section, fixedly retained within a mating contoured recess within the poppet member second diameter portion, having an axial outer surface adapted to sealingly mate with the raised valve seat portion of the valve seat retainer member, with the third diameter portion of the poppet member, in an at-rest position, axially extending, beyond the seal member axial outer surface and in the vicinity of the seal seat portion, with at least one predetermined diametral clearance, into the retainer member second diameter portion; and a shim, fixedly abutting and acting on the retainer member intermediate radial surface portion, provides an initial, predetermined sealing force, relative to the seal member axial outer surface, against the retaining roll pin, thereby preventing fuel leaks at low fluid supply pressure, with the predetermined peripheral clearance, relative to the poppet member serving to limit the compression of the elastic seal member as well as allowing compensating for any seal compression set.

In variations thereof, the axial outer surface of the elastic, annular seal member is one of being generally flattened, contoured, stepped and relieved, via surface finishing, after being fixedly retained within the recess; the elastic, annular seal member is fixedly retained within a matingly contoured annular recess located in the poppet member second diameter portion, the seal member being one of bonded, molded-in-place and cast-in-place; the at least one of the contoured recess and seal member has, in cross-section, an at least partial dovetail shape; and the elastic seal member is comprised of a stiff rubber-based composition having an approximate 90 durometer hardness; with the contoured valve seat portion being one of gradually tapering, semicircular and of a double inwardly-tapering shape.

In another variation thereof, the predetermined diametral clearance spaces between the corresponding first and second diameter portions of the valve sleeve and valve spool are located in at least one of the mutually adjoining sleeve inner wall and spool outer wall surfaces.

In a further variation thereof, the diametral clearance spaces function as predetermined, controlled, leakage paths through which a high pressure signal fluid can flow, via a fluid signal pressure conduit connected with the peripheral land cavity, from the high pressure signal cavity to adjoining areas of lower pressure between the valve sleeve and the valve spool via at least one further intermediate aperture and the diametral clearance spaces; with the percentage of fluid leakage being below about two percent of the total fluid flow within the assembly.

In still further variations, all axial movements of the valve spool, relative to the valve sleeve, are devoid of any contact with a dynamic seal.

In yet differing variation, all axially movable components of the main valve are located upstream of the valve seat retainer member, in a direction opposite to the flow of fuel exiting from the discharge orifice, the axially movable components thereby being protected from combustion products produced during operation of the gas turbine engine; with the axially movable components including the valve spool, the main valve spring, the poppet member, the poppet spring and the seal member.

In an additional variation thereof, the main valve centrally apertured spring retainer includes an inner annular end portion, having a plurality of spaced radial passages, at a location generally radially inwardly of the annular gland area, the retainer annular end portion, during certain predetermined operating positions of the staging valve assembly, being axially spaced differing distances, relative to the main valve spool; and wherein during at least one of the certain predetermined operating positions of the staging valve assembly, one of the axially spaced first and second pluralities of discrete radial passages is blocked by the main valve spool first diametral portion.

A differing variation thereof further including a fluid inlet plate, having a central cylindrical portion extending through the centrally apertured spring retainer into the cylindrical cavity, the fluid inlet plate being interposed between the spring retainer and a retaining ring in the main valve sleeve first cylindrical portion, the inlet plate cylindrical portion serving as an inlet for the fuel into the main valve; and a fuel strainer having a closed end and an open end, the open end being affixed to the inlet plate cylindrical portion, the fuel strainer extending into the central interior cavity of the main valve.

In another embodiment of this invention, the pilot valve of the staging valve assembly comprises: a dual diameter valve housing; a dual diameter cylindrical valve sleeve fixedly, sealingly and conformably received within the valve housing, the valve sleeve having a first diameter portion and a second diameter portion joined via an intermediate annular portion, with a peripheral land cavity being located between the sleeve intermediate portion and an adjacent portion of the valve housing; and the first diameter portion having a peripheral, recessed, annular gland area with a plurality of discrete radial passages therethrough; a dual diameter hollow cylindrical valve spool, having a central cavity, conformably and slidably received within the cylindrical valve sleeve, the spool having a first diameter portion and a second diameter portion joined via an intermediate annular portion, with predetermined diametral clearance spaces being provided between corresponding adjoining first and second diameter portions of the sleeve and spool, thereby permitting a predetermined amount of fluid leakage therebetween, during operation of the pilot poppet valve; and an annular pressure signal cavity, interconnected with the land cavity, being located between annular portions of the valve sleeve and the valve spool; a spring retainer fixedly and sealingly received within the sleeve first diameter portion and closing one end thereof; a pilot valve spring, interposed between the spring retainer and the spool intermediate annular portion, for preloading the spool against the sleeve; a centrally-apertured dual diameter valve seat retainer member having a first diameter portion and a second diameter portion joined via an intermediate radial surface portion, the retainer member first diameter portion being fixedly and sealingly received within an open end of the sleeve second diameter portion, with the retainer member intermediate radial surface portion being provided with an inwardly-directed, raised, central contoured seal seat portion adjoining the retainer member second diameter portion; a generally cup-shaped closure member is fixedly and sealingly received on the retainer member second diameter portion and includes a central pilot valve discharge orifice adapted to be operatively interconnected with the nozzle; a dual diameter poppet member having a first diameter portion and a second diameter portion, the first diameter portion being yieldingly, slidably received within an open end of the valve spool second diameter portion, with the axial movement of the poppet member being restricted via a split retaining roll pin press-fitted relative to the valve spool second diameter portion but having a predetermined peripheral clearance relative to the poppet member; a poppet spring, operatively interposed between the poppet member and a peripheral internal wall portion in the spool member second diameter portion, for axially biasing the poppet member toward the contoured seal seat portion, with the biasing being limited via the predetermined axial clearance, relative to the roll pin; a stiff, elastic, annular seal member, contoured in cross-section, fixedly retained within a mating contoured recess within the poppet member second diameter portion, having an axial outer surface adapted to sealingly mate with the raised valve seat portion of the valve seat retainer member; and a shim, fixedly abutting and acting on the retainer member intermediate radial surface portion, provides an initial, predetermined sealing force, relative to the seal member axial outer surface, against the retaining roll pin, thereby preventing fuel leaks at low fluid supply pressure, with the predetermined peripheral clearance, relative to the poppet member serving to limit the compression of the elastic seal member as well as allowing compensating for any seal compression set.

A variation thereof further includes a fluid pilot supply conduit interconnecting the pilot and main valve spool central cavities at their respective valve gland areas; and a source of fluid signal pressure, connected with the pilot valve peripheral land cavity, and a fluid pressure signal conduit, interconnecting the pilot and main valves at their respective peripheral land cavities, for supplying the fluid signal pressure to the main valve.

A further embodiment of this invention pertains to a gas turbine engine having a fuel staging valve assembly, for distributing fuel flow to a multiple zone nozzle therein, including a pilot valve operatively interconnected with at least one main valve, each of the valves including: a dual diameter valve housing; a dual diameter cylindrical valve sleeve fixedly, sealingly and conformably received within the valve housing, the sleeve having a first diameter portion and a second diameter portion joined via an intermediate annular portion, with a peripheral land cavity being located between sleeve intermediate portion and an adjacent portion of the valve housing; and the first diameter portion having a peripheral, recessed, annular gland area with at least an axially spaced first plurality of discrete radial passages therethrough; a dual diameter hollow cylindrical valve spool, having a central cavity, conformably and slidably received within the cylindrical valve sleeve, the spool having a first diameter portion and a second diameter portion joined via an intermediate annular portion, with predetermined diametral clearance spaces being provided between corresponding adjoining first and second diameter portions of the sleeve and spool, thereby permitting a predetermined amount of fluid leakage therebetween, during operation of the pilot poppet valve; and an annular pressure signal cavity, interconnected with the land cavity, being located between intermediate annular portions of the valve sleeve and the valve spool; a centrally apertured spring retainer fixedly received within the sleeve first diameter portion and closing one end thereof; a valve spring, interposed between the spring retainer and the spool intermediate annular portion, for preloading the spool against the sleeve; a centrally-apertured dual diameter valve seat retainer member having a first diameter portion and a second diameter portion joined via an intermediate radial surface portion, the retainer member first diameter portion being fixedly and sealingly received within an open end of the sleeve second diameter portion, with the retainer member intermediate radial surface portion being provided with an inwardly-directed, raised, central contoured seal seat portion adjoining the retainer member second diameter portion; a generally cup-shaped closure member is fixedly and sealingly received on the retainer member second diameter portion and includes a central main valve discharge orifice; a multiple diameter poppet member having interconnected first and second diameter portions; a poppet spring, operatively interposed between the poppet member and a peripheral internal wall portion in the spool member second diameter portion; a stiff, elastic, annular seal member, contoured in cross-section, fixedly retained within a mating contoured recess within the poppet member second diameter portion, having an axial outer surface adapted to sealingly mate with the raised valve seat portion of the valve seat retainer member; a shim, fixedly abutting and acting on the retainer member intermediate radial surface portion; a fluid pilot supply conduit interconnecting the pilot and main valve central cavities at their respective gland areas; a source of fluid signal pressure connected with the pilot valve peripheral land cavity; and a fluid pressure signal conduit interconnecting the pilot and main valves at their respective peripheral land cavities, wherein the improvement comprises: the poppet member first diameter portion being yieldingly, slidably, received within an open end of the valve spool second diameter potion, with the axial movement of the poppet being restricted via a split retaining roll pin press-fitted relative to the valve spool second diameter portion but having a predetermined clearance relative to the poppet member; the poppet spring axially biasing the poppet member toward the contoured seal seat portion, with the biasing being limited via the predetermined axial clearance, relative to the pin; and the shim providing an initial, predetermined, sealing force, relative to the seal member axial outer surface, against the retaining roll pin, thereby preventing fuel leaks at low fluid supply pressure, with the predetermined peripheral clearance, relative to the poppet member serving to limit the compression of the elastic member as well as allowing compensation for any seal compression set.

In a variation thereof, the main valve poppet member further includes an integral third diameter portion, with the third diameter portion, in an at-rest position, axially extending beyond the main valve seal member axial outer surface and in the vicinity of the main valve seal portion, with at least one predetermined diametral clearance, into the second diameter portion of the valve seal retainer member of the main valve.

In another variation thereof, the elastic, annular, seal member is fixedly retained within a matingly contoured annular recess located in the poppet member second diameter portion, the seal member being one of bonded, molded-in-place and cast-in-place; and the axial outer surface of the elastic, annular, seal member is one of being generally flattened, contoured, stepped and relieved, via surface finishing, after being fixedly retained within the recess.

In a further variation thereof, the elastic, annular, seal member is comprised of a stiff rubber-based composition having an approximate 90 durometer hardness; at least one of the contoured recess and seal member has, in cross-section, an at least partial dovetail shape; and the contoured valve seat portion is one of gradually tapering, substantially semicircular and of a double-inwardly tapering shape.

In yet another variations thereof, the predetermined diametral clearance spaces between the corresponding first and second diameter portions of the valve sleeve are located in at least one of the mutually-adjoining sleeve inner wall and spool outer wall surfaces, with the diametral clearance spaces functioning as predetermined, controlled leakage paths through which the high pressure signal fluid can flow, from the high pressure signal cavity to adjoining areas of lower pressure between the valve sleeve and the valve spool via at least one further intermediate aperture and the diametral clearance spaces; and the percentage of fluid leakage being below about 2% of the total fluid flow within the assembly.

In yet a further variation thereof, all axially movable components of the valve spool, relative to the valve sleeve, are devoid of any contact with a dynamic seal.

In additional variations thereof, all axially movable components of the valves are located upstream of the valve seat retainer member, in a direction opposite to the flow of fuel exiting from the discharge orifices, the axially slidable components thereby being protected from combustion products produced during operation of the gas turbine engine; with the axially movable components including the valve spools, the main springs, the poppet members, the poppet springs and the seal members.

In a differing embodiment of this invention the pilot valve of the fuel staging valve assembly comprises: a multiple diameter valve housing having a central cavity and a fluid signal pressure input port extending into the cavity; a multiple diameter cylindrical valve sleeve, the sleeve having multiple differing diameter sleeve portions, with one of the differing diameter sleeve portions having a peripheral, recessed, annular gland area with a plurality of discrete radial passages extending therethrough; and an intersection of two adjacent ones of the sleeve differing diameter portions serving as a seal seat portion; a multiple diameter cylindrical spool conformably and slidably received within the cylindrical valve sleeve, the spool having multiple differing diameter spool portions; a spring retainer slidably fixedly received on one of the spool differing diameter portions; a pilot valve spring, interposed between the spring retainer and another of the valve spool differing diameter portions; a generally cup-shaped, centrally apertured, valve seal retention member fixedly retained on another one of the valve spool differing diameter portions; a generally cylindrical blocking member having one end attached to and movable with the another one of the sleeve differing diameter portions, with another end of the blocking member being sealingly received against a step portion of the valve housing under certain predetermined valve operating conditions while permitting communication between the housing central cavity and a peripheral land cavity located between the blocking member and the housing; a stiff, elastic, annular seal member fixedly retained within the valve seal retention member, with a peripheral longitudinal portion of the retention member limiting the degree of compression of the seal member; a shim, fixedly abutting and acting upon the valve seal retention member, provides an initial, predetermined, sealing force, relative to the seal member, against the valve seal seat portion; and a centrally apertured disc closure member, attached to an exit portion of one of the two adjacent ones of the sleeve differing diameter portions, and including a central pilot valve discharge orifice.

A variation thereof further includes a fluid pilot supply conduit interconnecting the pilot and main valve peripheral land cavities; and a source of fluid signal pressure, connected with the pilot valve central cavity, and a fluid pressure signal conduit, interconnecting the pilot and main valves at their respective valve gland areas, for supplying the fluid signal pressure to the main valve.

DETAILED DESCRIPTION OF THE PREFERRED EMBODIMENT

Figure 1:
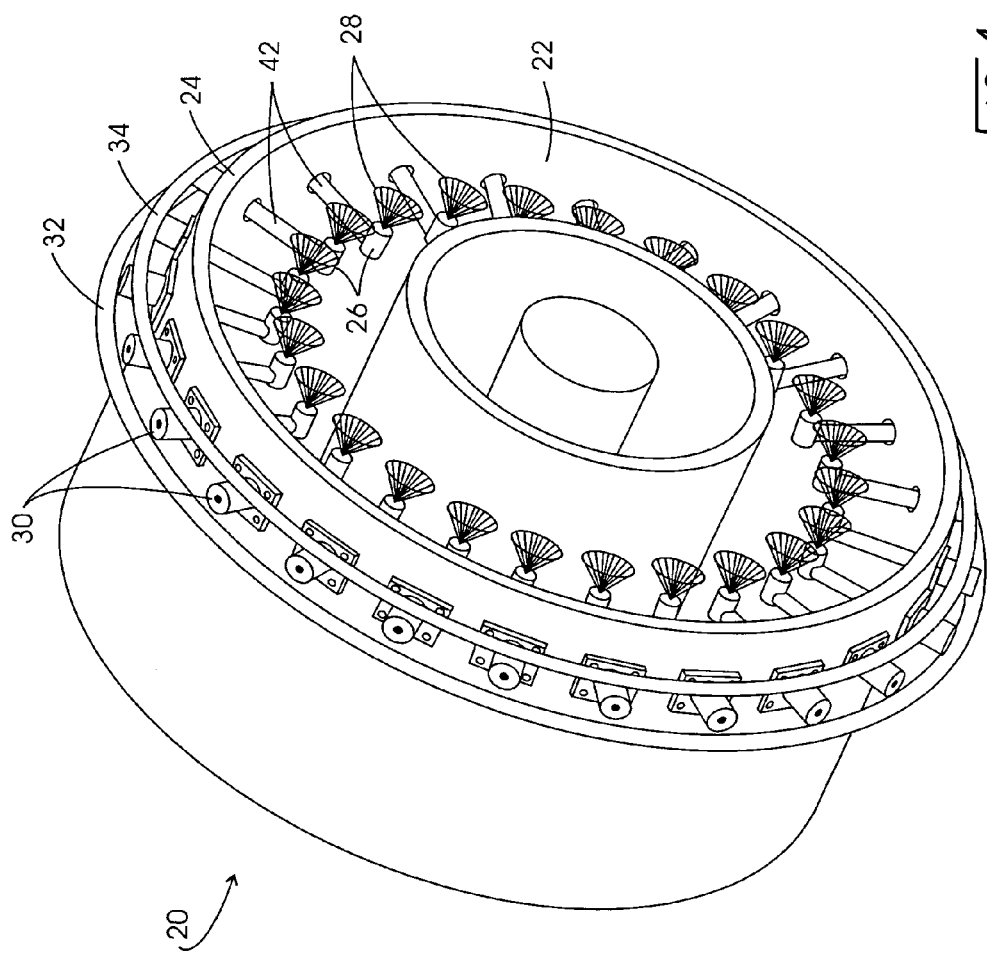
FIG. 1 is a schematic, greatly simplified cross-sectional side view of a gas turbine engine combustion chamber having main and signal fuel manifolds connected to and utilizing pluralities of individual fuel staging valve assemblies constructed according to the principles of this invention.

Referring now to the several drawings, and initially to FIG. 1, there is shown a schematic and greatly simplified portion of a gas turbine engine, generally indicated at 20. Mounted on an upstream, outer wall portion 24 of a combustion chamber 22 are a plurality fuel injector assemblies, for example as indicated generally at 26. Each fuel injector assembly 26 includes a nozzle tip 28 and a fuel staging valve assembly 30, which is constructed according to the present invention. The plurality of preferentially circumferentially-spaced fuel injector assemblies 26, each including a fuel staging valve assembly 30, are connected via circumferential main fuel manifold 32 and signal fuel manifold 34. Combustion chamber 22 is a typical combustion chamber for aircraft engine applications, known to those skilled in the art, and will thus not be discussed further, for the sake of brevity. Fuel injector assemblies 26 atomize and direct fuel into combustion chamber 22 for ignition. A compressor (not shown) is mounted upstream of the fuel injectors and provides pressurized air at elevated temperatures in combustion chamber 22 to facilitate combustion. The air is typically provided at highly elevated temperatures which can reach over 1000 degrees F. in aircraft applications.

While fuel injector assemblies 26 and fuel staging valve assemblies 30 of the present invention are particularly useful in gas turbine engines for aircraft, these assemblies are also deemed to be useful in other types of applications, such as industrial power generating equipment as well as marine and overland propulsion applications.

Figure 2:
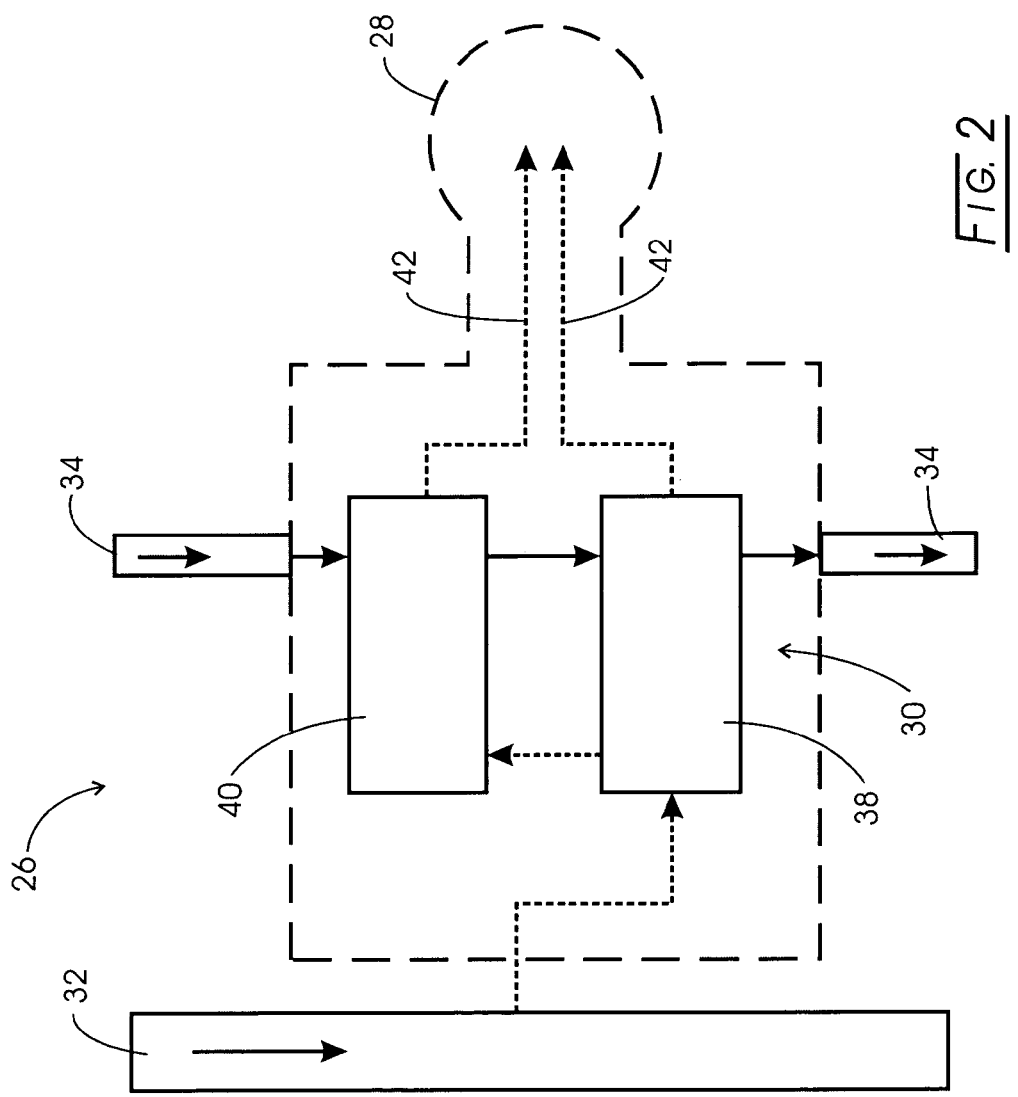
FIG. 2 is a simplified, schematic showing of one the fuel staging valve assemblies of FIG. 1 with reference to but one nozzle tip.

Turning now to FIG. 2, there is illustrated a simplified schematic of one of the fuel staging valve assemblies 30 of FIG. 1, with reference to but a single nozzle tip 28. Fuel staging valve assembly 30 (hereinafter "staging valve 30") includes an operatively interconnected pilot or primary valve 38 and at least one main or secondary valve 40, which in turn are also operatively interconnected with nozzle tip 28 via one or more known fuel feeds 42. It should also be understood by those skilled in the art that staging valve 30 is operatively interconnected with both one or more main manifolds 32 and signal manifold 34, which provide fuel at main and signal pressures, respectively to staging valve 30 in a manner to be explained in more detail hereinafter.

Figure 3:
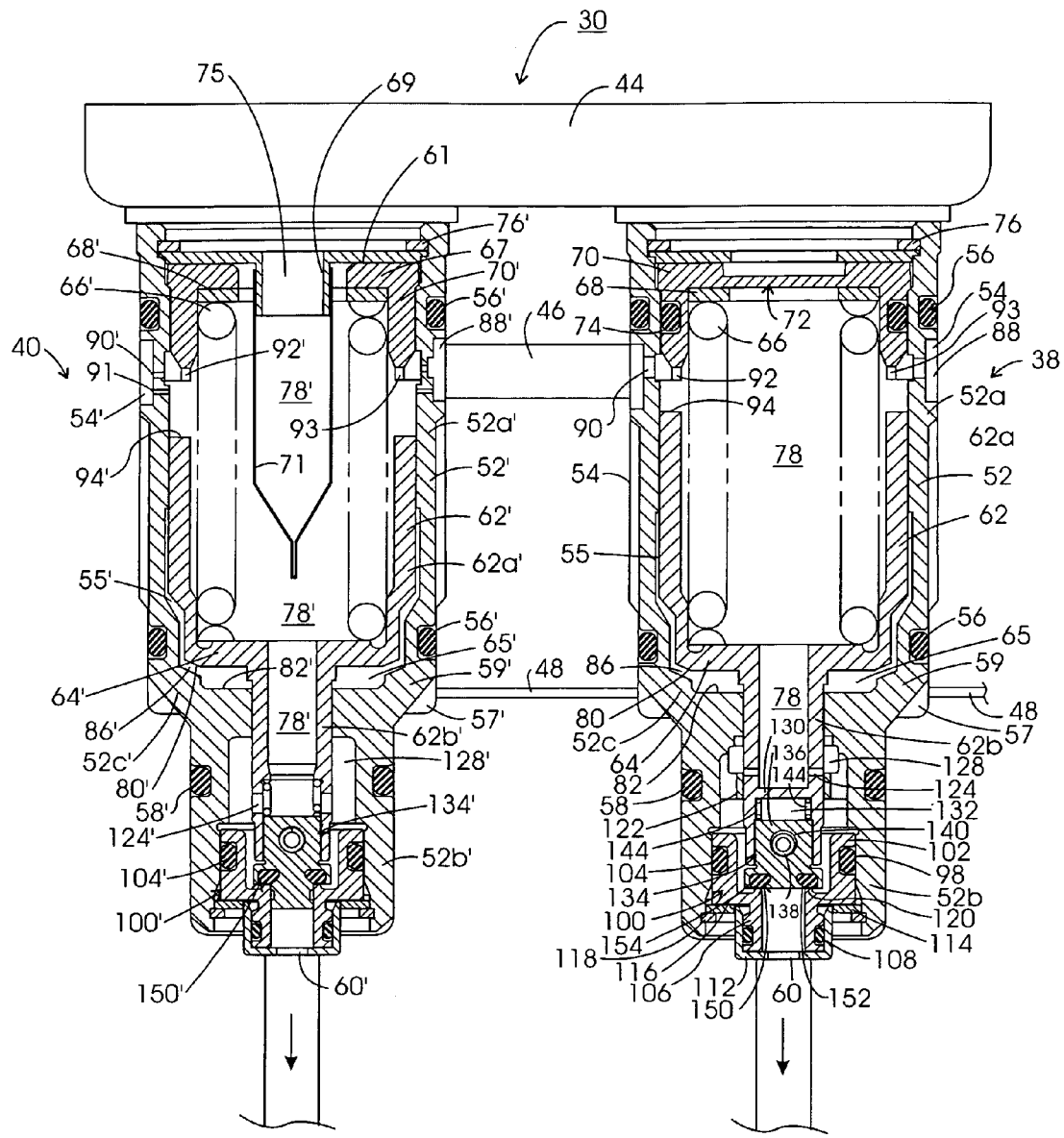
FIG. 3 is a vertical sectional view of one embodiment of the fuel staging valve assemblies of this invention, comprised of interconnected pilot and main valves.

As better seen in FIG. 3, there is illustrated a first embodiment of staging valve 30, generally comprised of a first embodiment of a pilot or primary valve 38 and one or more main or secondary valves 40, linked via a fuel supply pressure plenum 44 (interconnected with main fuel manifold 32—not shown here), by a fluid supply conduit 46, and by fluid signal pressure conduit 48, the latter initially extending into a peripheral cavity portion 57 of pilot valve 38. For the sake of simplicity, the following description will be limited to an example arrangement that utilizes only one main valve 40, although additional such valves could be utilized in engines that require more than two zones per nozzle or more complex fuel staging.

Turning first to pilot valve 38, its dual diameter, hollow, cylindrical sleeve 52, which is sealingly received within a conforming housing cavity portion 54 via multiple elastic sealing members 56 and 58, has its larger diameter outer portion 52a in abutting but not operative contact with pressure plenum 44, while its smaller diameter end portion 52b, having a pilot discharge aperture 60, is operatively connected to a fuel feed 42 (FIG. 2). A dual diameter, hollow, cylindrical valve spool 62 is slidably and conformably received within sleeve 52, with larger diameter spool portion 62a being slidably received within sleeve portion 52a while smaller diameter spool portion 62b is slidably received within sleeve portion 52b. Joining spool portions 62a and 62b is a radial annular wall portion 64, the inner end of which serves as an inner support portion for one end of a valve spring 66 whose other end abuts a washer 68, received within an interior cylindrical cavity 72 of a basically cup-shaped spring retainer 70, which is sealingly received, via an elastic sealing member 74, within sleeve portion 52a and retained therein by a removable retaining ring 76. It should be noted that cup-shaped retainer 70 blocks all direct communication between supply pressure plenum 44 and the interior cavity 78 of pilot valve 38.

A perusal of the structure of pilot valve 38, in FIG. 3, which depicts valve 38 in an at-rest or shutdown position, shows valve spring 66 at its full extension, i.e., the outer portion of valve spool radial wall portion 64 abuts an inner end ledge portion 80 of sleeve portion 52b. At least one of valve sleeve 52a and spool portion 62a is peripherally undercut or relieved so as to produce an intermediate space or cavity 55 there between. Cavity 55 is in communication with an annular intermediate cavity 65, between spool radial portion 64 and sleeve portion radial surface 82, the noted communication, between cavities 55 and 65 taking place via at least one aperture 86 between wall portion 64 and ledge portion 80, thus producing a basically cup-shaped cavity by the joining of cavities 55 and 65. A tapered portion 52c, joining pilot valve sleeve portions 52a, 52b, is provided with at least one aperture 59 which serves to provide communication between cavities 55, 65 and peripheral cavity portion 57 in housing cavity 54 which in turn communicates with fluid signal pressure conduit 48.

Near the outer end of valve sleeve portion 52a, adjacent to one of the elastic sealing members 56, there is provided a recessed annular area 88 having a plurality of radial apertures 90 which lead into an internal pilot valve cavity 78, past discreet passages 92 in the annular end portion 93 of spring retainer 70, the latter serving as an abutment for annular surface 94 of the open end of movable valve spool portion 62a, as will be explained in more detail hereinafter.

Figure 3A:
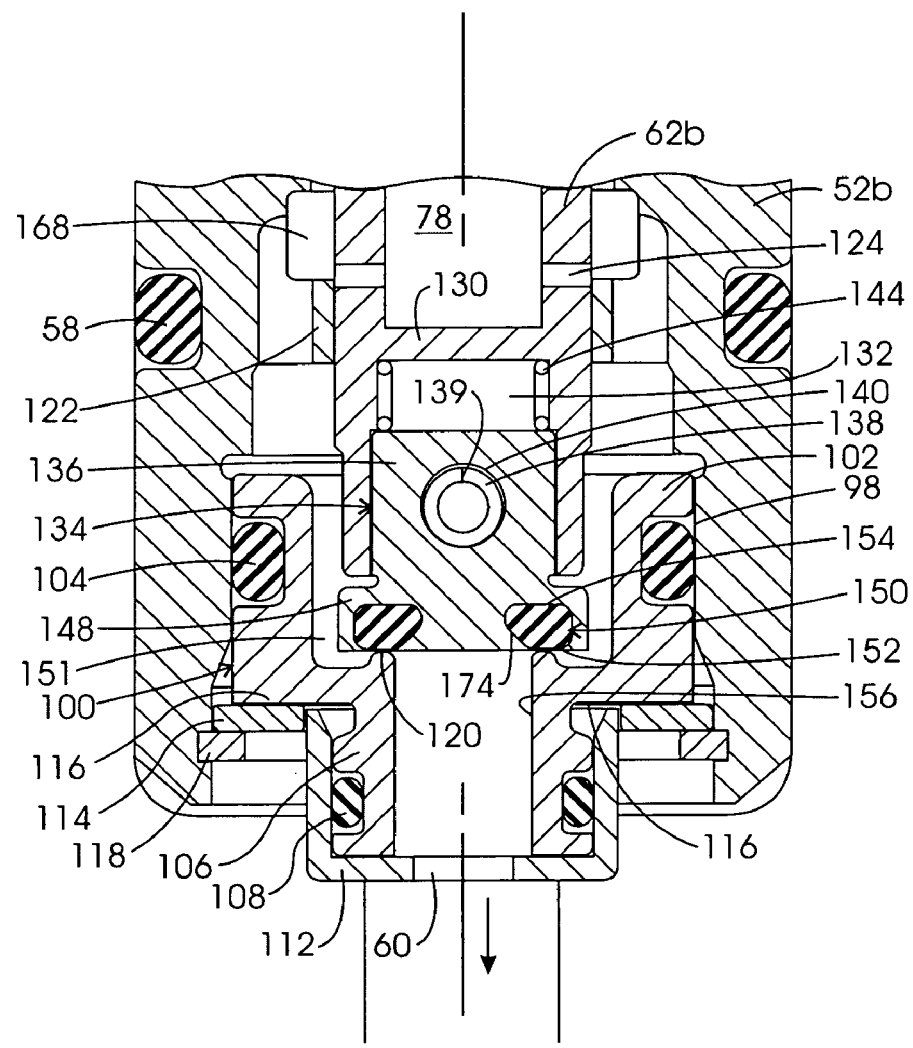
FIG. 3a is an enlarged showing of the discharge portion of the pilot valve of FIG. 3, particularly of the valve seat and seal.

As best seen in FIG. 3a, which is an enlarged showing of the discharge portion of the pilot valve 38 of FIG. 3, sealingly received, via seal member 104, within a recessed cylindrical portion 98 of valve sleeve portion 52b, is the larger diameter portion 102 of a generally cylindrical valve seat retainer member 100 also having a smaller diameter portion 106 with an inner cavity 156, sealed via an elastic sealing member 108 against an inner surface of generally cup-shaped closure member 112. Member 112, which is provided with bottom, central discharge aperture 60, has its inner end portion abutting against a radial surface portion 116 of valve seat retainer member 100 which is held in place via a removable retaining ring 118 and an intermediate washer or shim 114. Radial surface portion 116 is provided with a raised, central contoured surface seal seat portion 120.

Turning again to FIG. 3a, pilot valve spool portion 62b, situated approximately radially inwardly of the location of elastic sealing member 58 is provided with an annular guide ring portion 122 which provides a guidance and support function for the lower part of hollow cylindrical valve spool portion 62b which is in turn provided with lateral cross ports 124, thus permitting fluid communication between pilot valve cavity 78 and a cavity 128 formed between valve spool portion 62b and valve sleeve portion 52b. Extending transversely across spool portion 52b is a lateral wall portion 130 that serves to separate valve cavity 78 from axially adjacent open ended cylindrical cavity 132 having a cylindrical first portion 136 of a poppet 134 axially slidingly located therein. The axial movement of poppet 134 is limited via a retaining split roll pin 138 extending through poppet 134 and the radially adjacent part of spool portion 62b. While pin roll 138 is press-fitted relative to spool portion 62b via spring force applied by an intermediate gap or split 139 in pin 138, the spool aperture portion 140, within poppet cylindrical poppet portion 136, is greater in diameter than the diameter of pin 138, thus permitting a limited amount of floating or axial movement of poppet 134 within cavity 132. A poppet spring 144, interposed between wall portion 130 and poppet 134 normally biases the latter against pin 138.

Poppet 134 also includes a larger diameter second portion 148 which has an annular elastic seal member 150, contoured in cross section, fixedly received within a matingly contoured annular recess 154 located within poppet portion 148. Elastic seal 150 is preferably comprised of a stiff elastomeric (e.g., 90 durometer hardness) composition that is bonded, molded-in or cast-in-place and has a contoured locked-in profile, relative to recess 154, so as to prevent displacement thereof both at high static pressure conditions that can reach a magnitude of e.g. 800 psi., and during high dynamic pressure conditions which occur during flowing operation. The preferably flat axial outer surface 152 of seal member 150 is adapted to sealingly mate with control valve seat portion 120, under certain operating positions which will be explained hereinafter, to block fluid communication between the regions upstream of gap 151, located around the annuli of poppet portion 148, and pilot discharge aperture 60. It should be noted that since contoured seat portion 120 is raised, relative to seat retainer surface portion 116, this results in the open area or gap 151 which in turn provides a space for the expansion of seal 150 and at the same time limiting the extent of the compression of seal 150.

Turning now to main or secondary valve 40, its construction, shown in FIG. 3, is very similar, though not identical to that of pilot or primary valve 38. Therefore, like or similar parts are denominated with like, but primed, numerals. Thus, in main valve 40, its dual diameter, hollow, cylindrical sleeve 52', which is sealingly received within another conforming housing cavity portion 54' via elastic multiple sealing members 56' and 58', has its larger diameter outer portion 52a' in abutting and operative contact with pressure plenum 44, while its smaller diameter end portion 52b', having a main discharge aperture 60', is operatively connected to a fuel feed 42 (FIG. 2). A dual diameter, hollow, cylindrical valve spool 62' is slidably and conformably received within sleeve 52', with larger diameter spool portion 62a' being slidably received within sleeve portion 52a' while smaller diameter spool portion 62b' is slidably received within sleeve portion 52b'. Joining spool portions 62a' and 62b' is a radial annular wall portion 64', the inner end of which serves as an inner support portion for one end of an extensible higher rate valve spring 66' whose other end abuts a washer 68', received within an interior annular ring portion 67 of a basically centrally apertured cup-shaped spring retainer 70', which is slidably received within sleeve portion 52a' and retained therein by a removable retaining ring 76'. Interposed between ring 76' and spring retainer portion 70' is a fluid pressure inlet plate 61 having a central cylindrical portion 69 extending through ring portion 67. The exterior surface of cylindrical portion 69 serves as a retainer for a fluid inlet strainer 71 that is open to supply pressure plenum 44. It should be noted that aperture 75 in cup-shaped retainer 70' allows direct communication between supply pressure plenum 44 and the interior cavity 78' of pilot valve 40.

A perusal of the structure of main valve 40, in FIG. 3, which depicts valve 40 in an at-rest or shutdown position, shows valve spring 66' at its full extension, i.e., the outer portion of valve spool radial wall portion 64' abuts an inner end ledge portion 80' of sleeve portion 52b'. At least one of valve sleeve 52a' and spool portion 62a' is peripherally undercut or relieved so as to produce an intermediate space or cavity 55' therebetween. Cavity 55' is in communication with an annular intermediate cavity 65', between spool radial portion 64' and sleeve portion radial surface 82', the noted communication, between cavities 55' and 65' taking place via at least one aperture 86' between wall portion 64' and ledge portion 80', thus producing a basically cup-shaped cavity by the joining of cavities 55' and 65'. A tapered portion 52c', joining main valve sleeve portions 52a', 52b', is provided with at least one aperture 59' which serves to provide communication between cavities 55', 65' and peripheral cavity portion 57' in housing cavity 54' which in turn communicates with fluid signal pressure conduit 48.

Near the outer end of valve portion 52a', adjacent to one of the elastic sealing members 56' and aligned with signal supply conduit 48, there is provided a recessed annular gland area 88' having a plurality of first and second spaced radial apertures 90' and 91 which lead into an internal pilot valve cavity 78', past discrete passages 92' the annular end portions 93' of spring retainer 70', the latter serving as abutments for annular surface 94' of the open end of movable valve spool portion 62a', as will be explained in more detail hereinafter.

Figure 4:
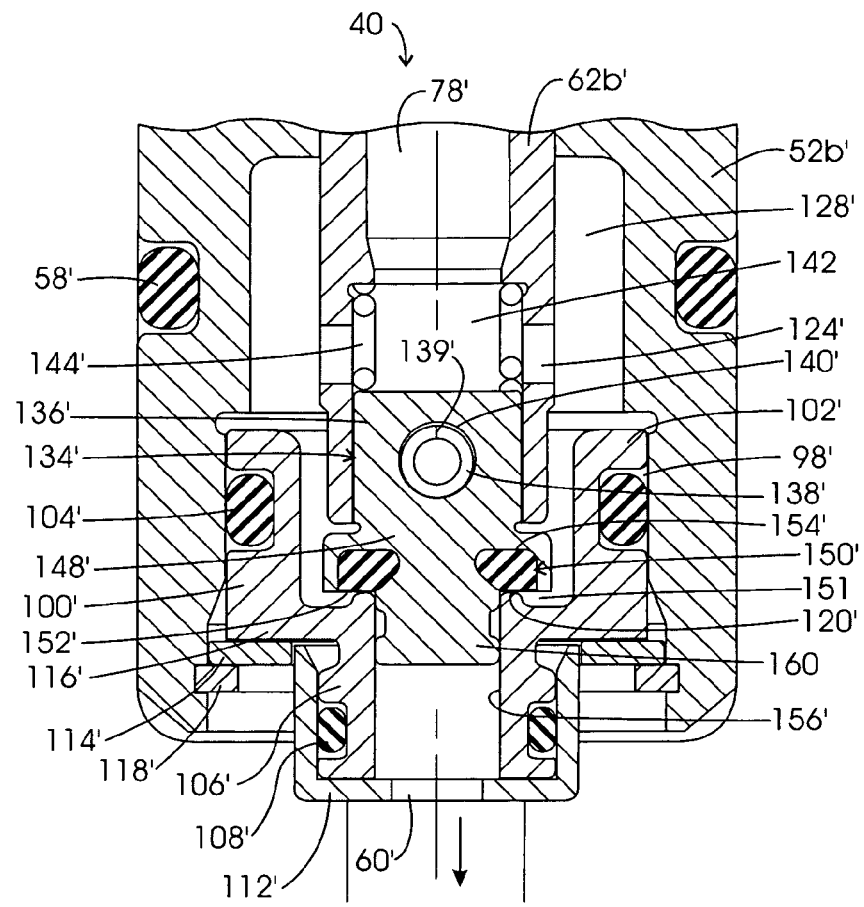
FIG. 4 is an enlarged showing of the discharge portion of the main valve of FIG. 3, particularly of the valve seat and seal.

Turning now to FIG. 4, which is an enlarged showing of the discharge portion of main valve 40 of FIG. 3, sealingly received, via seal member 104', within a recessed cylindrical portion 98' of valve sleeve portion 52b', is the larger diameter portion 102' of a generally cylindrical valve seat retainer member 100' also having a smaller diameter portion 106', sealed via an elastic sealing member 108' against an inner surface of generally cup-shaped closure member 112'. Member 112', which is provided with bottom, central discharge aperture 60', has its inner end portion abutting against a radial surface portion 116' of valve seat retainer member 100' which is held in place via a removable retaining ring 118' and an intermediate washer or shim 114'. Radial surface portion 116' is provided with a raised, central contoured surface seal seat portion 120'.

Turning again to FIG. 4, pilot valve spool portion 62b', situated approximately radially inwardly of the location of elastic sealing member 58' is provided with lateral cross ports 124', thus permitting fluid communication between pilot valve cavity 78' and a cavity 128' formed between valve spool portion 62b' and valve sleeve portion 52b'. The lower end of valve cavity 78' terminates as a slightly larger diameter open cylindrical cavity 142, a portion of which has a cylindrical first portion 136' of a poppet 134' axially slidingly located therein. The axial movement of poppet 134' is limited via split roll retaining pin 138' extending through poppet 134' and the radially adjacent part of spool portion 62b'. While pin 138' is press-fitted relative to spool portion 62b' via spring force applied by an intermediate gap 139', the aperture portion 140' thereof, within poppet cylindrical poppet portion 136', is greater in diameter than the diameter of pin 138', thus permitting a limited amount of floating or axial movement of poppet 134' within cavity 142. A poppet spring 144', interposed between a shoulder portion 144, located at the intersection of cavities 78', 142 and poppet 134' normally biases the latter against pin 138'.

Poppet 134' also includes a larger diameter second portion 148' which has an annular elastic seal member 150', contoured in cross section, fixedly received within a matingly contoured annular recess 154' located within poppet portion 148'. Elastic seal member 150' is preferably comprised of a stiff elastomeric (e.g., 90 durometer hardness) of, for example, a rubber-based composition that is bonded, molded-in or cast-in-place and has a contoured locked-in profile, relative to recess 154', so as to prevent displacement thereof both at high static pressure conditions that can reach a magnitude of e.g. 800 psi., and during high dynamic pressure conditions during flowing operation. The preferably flat axial outer surface 152' of seal member 150' is adapted to sealingly mate with control valve seat portion 120', under certain operating positions which will be explained hereinafter, to block fluid communication between the regions upstream of gap 151' and main discharge aperture 60'. It should be noted that since contoured seat portion 120' is raised, relative to seat retainer surface portion 116', this results in the open area or gap 151' which in turn provides a space for the expansion of seal 150' and at the same time limiting the extent of the compression of seal 150'.

Figure 5:
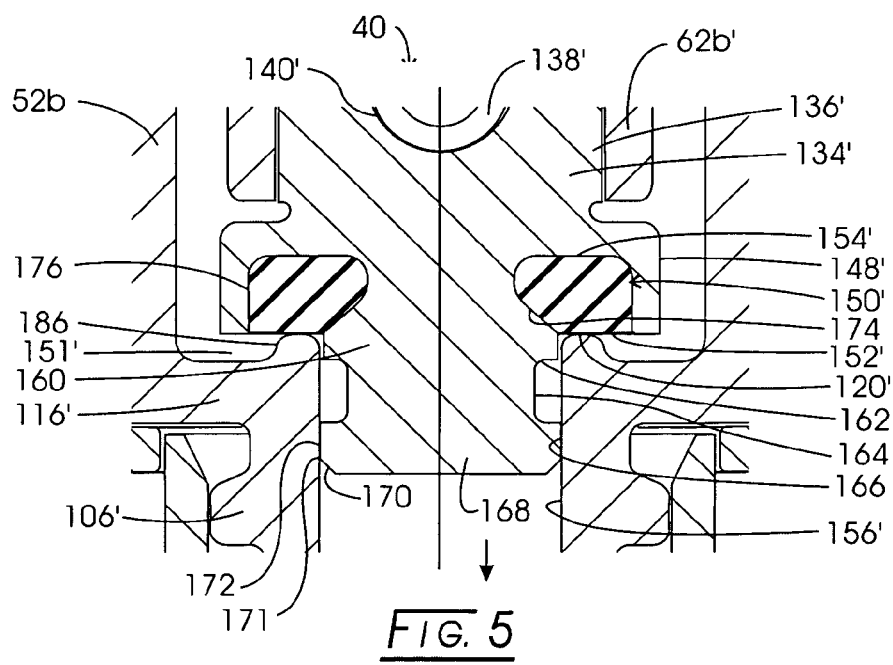
FIG. 5 is a further enlarged showing of the valve seat and seal portion of FIG. 4.

As best seen in FIG. 5, poppet larger diameter second portion 148', at the plane of seal axial outer surface 152', merges into a smaller cylindrical third portion 160, which in the at-rest or shut-down position of main valve 40, as illustrated in FIGS. 3, 4 and 5, extends into cylindrical cavity 156' of valve seat retainer portion 106'. Poppet cylindrical third portion 160 further includes a first or small diameter band 162, abutting the plane of seal valve outer surface 152' and a second or larger diameter band 166, with bands 162, 166 being separated via a circular undercut or recess portion 164. An angled relief band 170 separates a circular end face 168 of poppet third portion 160 from band 166. It should be understood that the area between valve seat outer surface 182 and the diameter of cylindrical cavity 156', which is also the inner diameter of contoured seat portion 120, determines the force area acting on elastic seals 150 (FIGS. 3, 3a) and 150'. In addition, there is a clearance space 172, between the diameters of cavity 156' and band 166, for fuel flow, in a position of operation to be described in more detail hereinafter.

Figure 6:
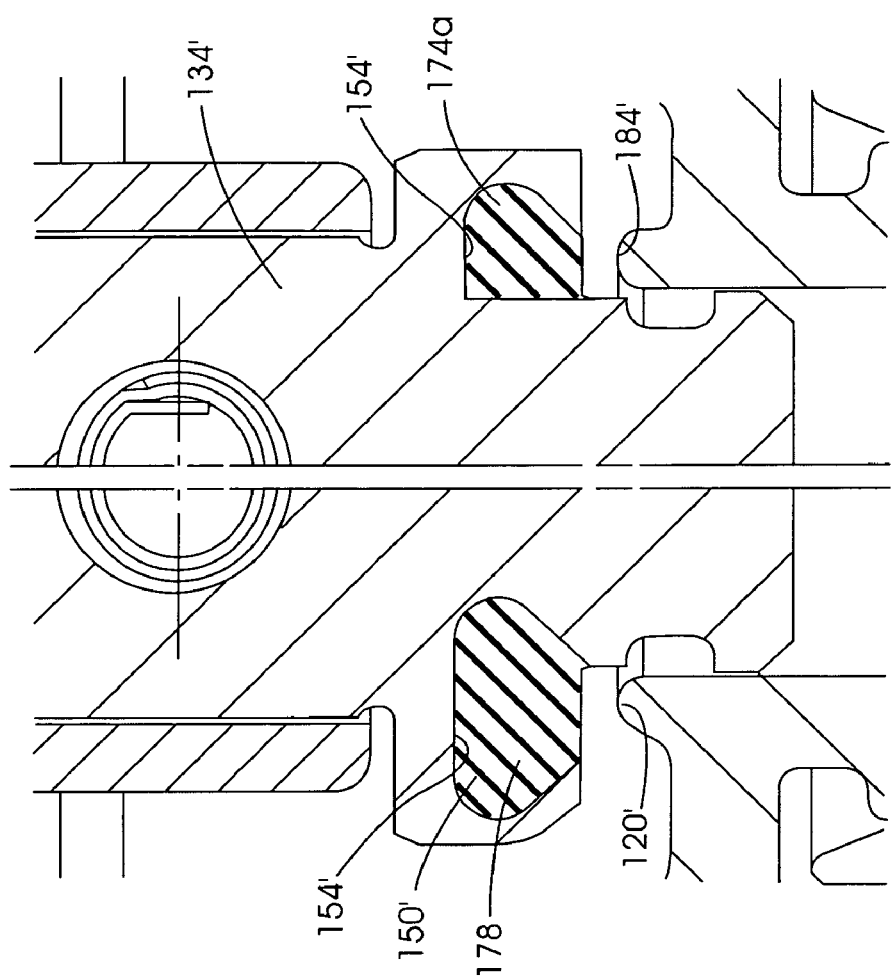
FIGS. 6a and 6b are schematic, opposite half sections of a valve seal utilizing two differing valve seat configurations, respectively.
Figure 7:
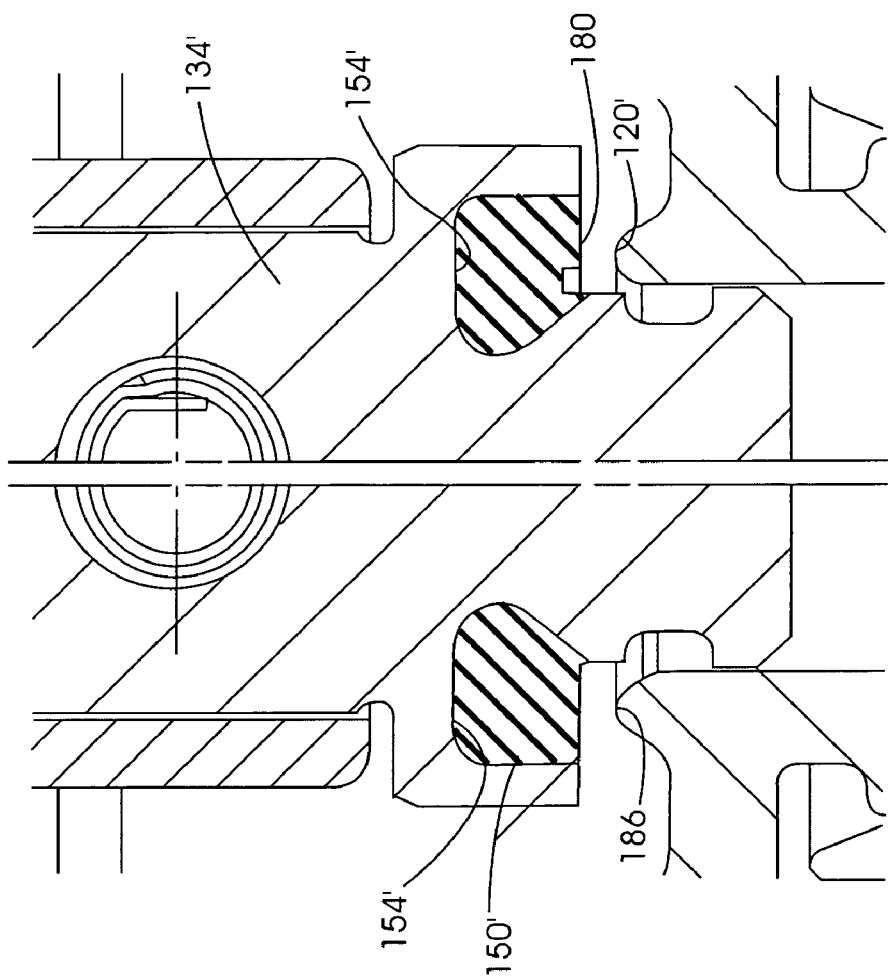
FIGS. 7a and 7b are sections, similar to FIGS. 6a and 6b, but showing yet a differing valve seat configuration in FIG. 7a, while showing a valve seal having a differing cross-section in FIG. 7b.

Returning now to seal 150' in FIG. 5, it illustrates same as having a contour, such as the half-dovetail-conforming shape 174 of its inner annular surface, while retaining a generally cylindrical outer surface 176, normal to generally flat outer surface 152'. The converse thereof can also be utilized in that a half-dovetail-conforming shape 174a can also be utilized as an outside surface while using a cylindrical annular inner surface, as schematically shown in FIG. 6b. Additional retention, for seal 150', within poppet contoured recess 154' can be achieved via the use of a full-dovetail-conforming shape 178, as shown in FIG. 6a. If deemed necessary, the generally flat outer surface 152' of seal 150' can be contoured, stepped or relieved, e.g., via surface finishing such as machining after being cast-in-place, in the manner generally indicated at 180 in FIG. 7b in order to limit the extrusion of seal 150' during valve operation. The noted variations are equally applicable to pilot valve seal 150.

Furthermore, while valve seat 120' in FIG. 5 utilizes a contoured surface emerging from the straight-sided inner surface of cylindrical cavity 156, its outer surface 182 tapers more gradually toward poppet radial surface portion 116'. Other valve seat shapes include a semicircular shape 184, in cross section, shown in FIG. 6b and a double-sided inwardly-tapered shape 186, shown in FIG. 7a. The exact shapes of seal 150 or 150' and valve seat 120 or 120' depend upon the material composition of seal 150 or 150' as well as the degree of seal material deformation as well as the fluid pressures and fluctuations thereof encountered during actual operation of valves 38 and 40.

One of the numerous advantages of the staging valve assembly 26 of this invention is that neither of valves 38 and 40 utilizes any dynamic seals, such as O-rings, to seal the movements of spools 62, 62' relative to sleeves 52, 52', respectively. The absence of such dynamic seals provides for much greater consistency of operation since, during operation, the use of dynamic seals results in a stick-slip effect that varies the coefficient of friction—an undesirable characteristic that contributes to unacceptable valve hysteresis. In addition, dynamic seals will deteriorate and harden as a result of usage and aging, thus again adversely affecting performance as well as shortening service life. In order to avoid the use of such dynamic seals, a predetermined, limited amount of controlled leakage or flow is therefore permitted between sleeves 52, 52' and spools 62, 62' in the areas of movement of the latter, relative to the former, in the general areas indicated schematically in FIG. 12, as circled areas A–D, and illustrated in detail in FIGS. 13a–13d, respectively. Specifically, at least one of the mutually adjoining sleeve inner wall and spool outer wall surfaces 53a', 53b' (or 53a, 53b) and 63a', 63b' (or 63a, 63b), respectively, is provided with a predetermined controlled leakage path, flow channel or clearance space 73 (or 73') through which, as will be explained hereinafter, higher pressure signal fluid can leak or flow from higher pressure signal cavity 65' (or 65) to areas of main fuel feed which is at a lower pressure. The actual amount or percentage of fluid leakage is quite small—on the order of 2% of the total flow. Although not negligible, this flow rate can be readily calculated and thus taken into account for control purposes.

In terms of the operation of fuel staging valve 26, attention is now directed to an example, FIGS. 8–12 which illustrate staging valve assembly 26, comprised of operatively interconnected pilot valve 38 and main valve 40, in sequential shut-down position (FIG. 8); position 1 (FIG. 9); position 2 (FIG. 10); position 3 (FIG. 11); and position 4 (FIG. 12), respectively. In the FIG. 8 shut-down position, both valve spool portions 62a and 62a' abut their respective valve sleeve ledges 80, 80' by being biased there against via their respective valve springs 66, 66'. In the shut-down position the main manifold 32, pilot manifold 34, supply plenum 44 and internal valve cavities 78, 78', 128' 128' and 132 are filled with stagnant fuel under low pressure.

Cavities 78 and 78' are also interconnected via pilot supply conduit 46, with cavity 78' also being interconnected with plenum 44. Conduit 46 serves to supply fuel to pilot valve 38. Specifically, fuel flows from plenum 44 to main cavity 78', through filter/strainer 71, and then proceeds through pilot supply conduit 46 into pilot valve 38. At the same time, no signal pressure fluid enters into pilot valve peripheral cavity 57 from pressure signal conduit 48. The pressures in all mentioned cavities during shut-down position are equal and no fluid flow is present.

Figure 9:
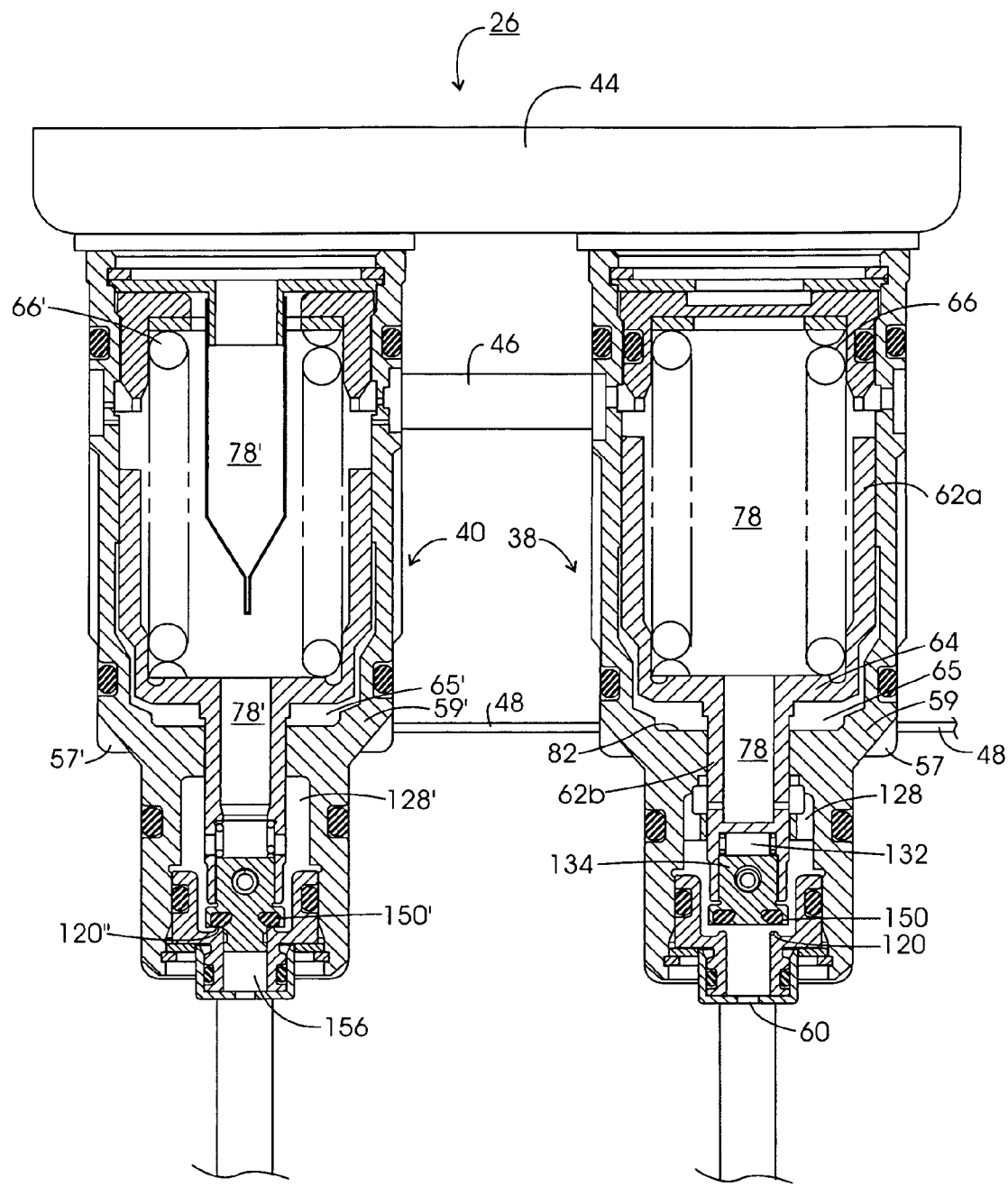

Turning now to the position 1 operation, in FIG. 9, fuel at a predetermined pressure, for engine operative purposes, now completely fills plenum 44 as well as cavities 78, 78', 128, 128' and 132. At the same time, pressurized signal fluid (also fuel), flows from peripheral land cavity 57, via aperture 59, into pilot valve cavity 65, at another predetermined pressure sufficient to compress pilot valve internal spring 66, via valve spool intermediate or annular radial wall portion 64, for a first predetermined distance, but short of upper annular surface 94 of spool portion 62a abutting or bottoming out on spring retainer lower end portion 70, (staging valve position 1). This first movement is sufficient to lift elastic seal surface 152, via poppet 134 and spool portion 62b, from its sealing engagement with valve seat 120, through the upward displacement of spool 62 away from sleeve inner end surface 82, thereby permitting the pressurized fuel within cavity 128 to exit therefrom via pilot valve discharge aperture or exit orifice 60. It should be understood that during position 1 operation, although pressurized signal fluid also enters into main valve cavity 65', this fluid pressure is insufficient to overcome the force of main valve spring 66' and thus main valve 40 remains fully closed, with all of the fuel being delivered into the engine combustion chambers 20 being supplied by pilot valve 38.

Figure 10:
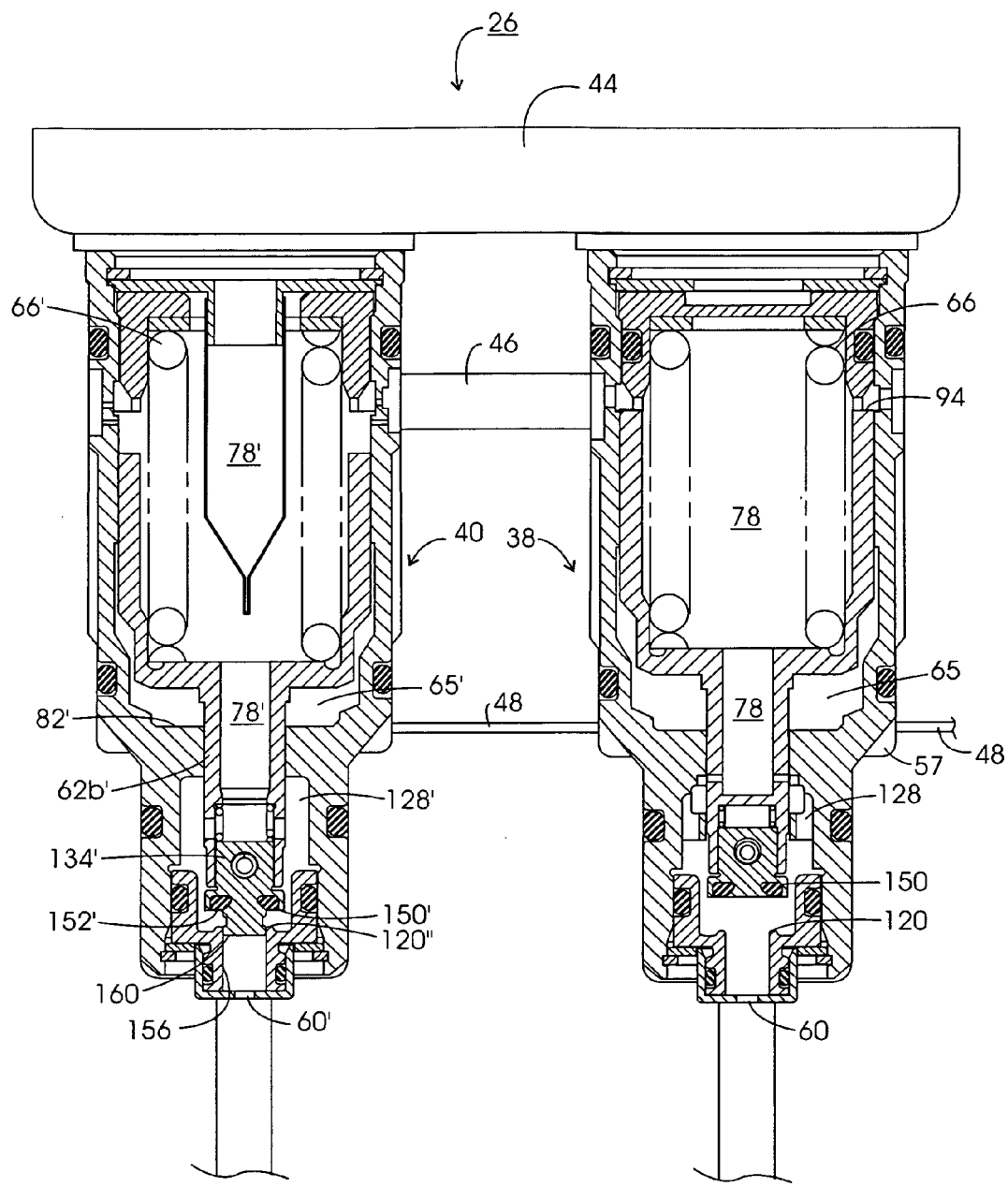

Continuing further to position 2 operation in FIG. 10, a further increase in the predetermined pressure of the signal fluid causes further lifting of seal member 150, and due to the bottoming out of pilot spool 62 on spring retainer 70, this second predetermined amount of signal fluid pressure, which also enters main valve cavity 65' is now sufficient to initially compress main valve internal spring 66' for a first predetermined distance. This first distance is sufficient to lift elastic main seal surface 152', via poppet 134' and spool portion 62b', from its sealing engagement with valve seat 120' through the upward displacement of spool 62' away from sleeve inner end surface 82'. As a result, pressurized fuel is permitted to flow beyond valve seal 150', poppet band 166, and through clearance 172 into main valve cavity 156 and thereafter into combustion chamber 22 (FIG. 2), via main valve discharge aperture 60'. It should be understood that in position 2 operation, poppet band 166 is still located within main valve cylindrical cavity 156, with fuel exiting therefrom via clearance 172.

Figure 11:
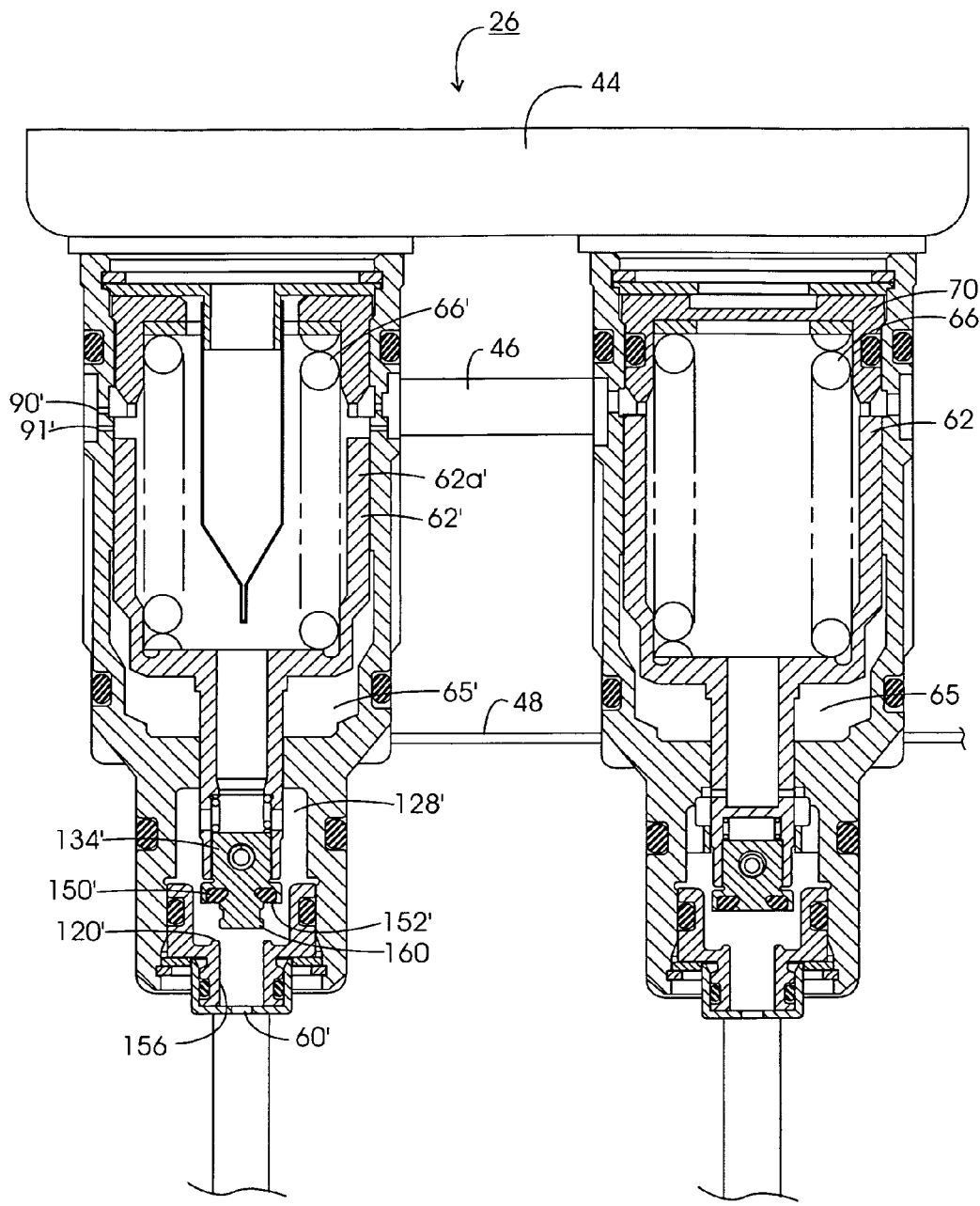

Continuing further to position 3 operation in FIG. 11, while a further increase in the predetermined pressure of the signal fluid can no longer cause further lifting of seal member 150, due to the previous bottoming out of pilot spool 62 on spring retainer 70, this third predetermined amount of signal fluid pressure which also enters main valve cavity 65' is now sufficient to further compress main valve internal spring 66' for a second predetermined distance (staging valve position 3) so as to cause elastic seal 150 to be lifted yet further away from valve seat 120', thereby fully extracting poppet plug portion third cylindrical portion 160 from cavity 156, thus permitting greater fuel flow from cavity 156 into combustion chamber 22, via aperture 60'.

Figure 12:
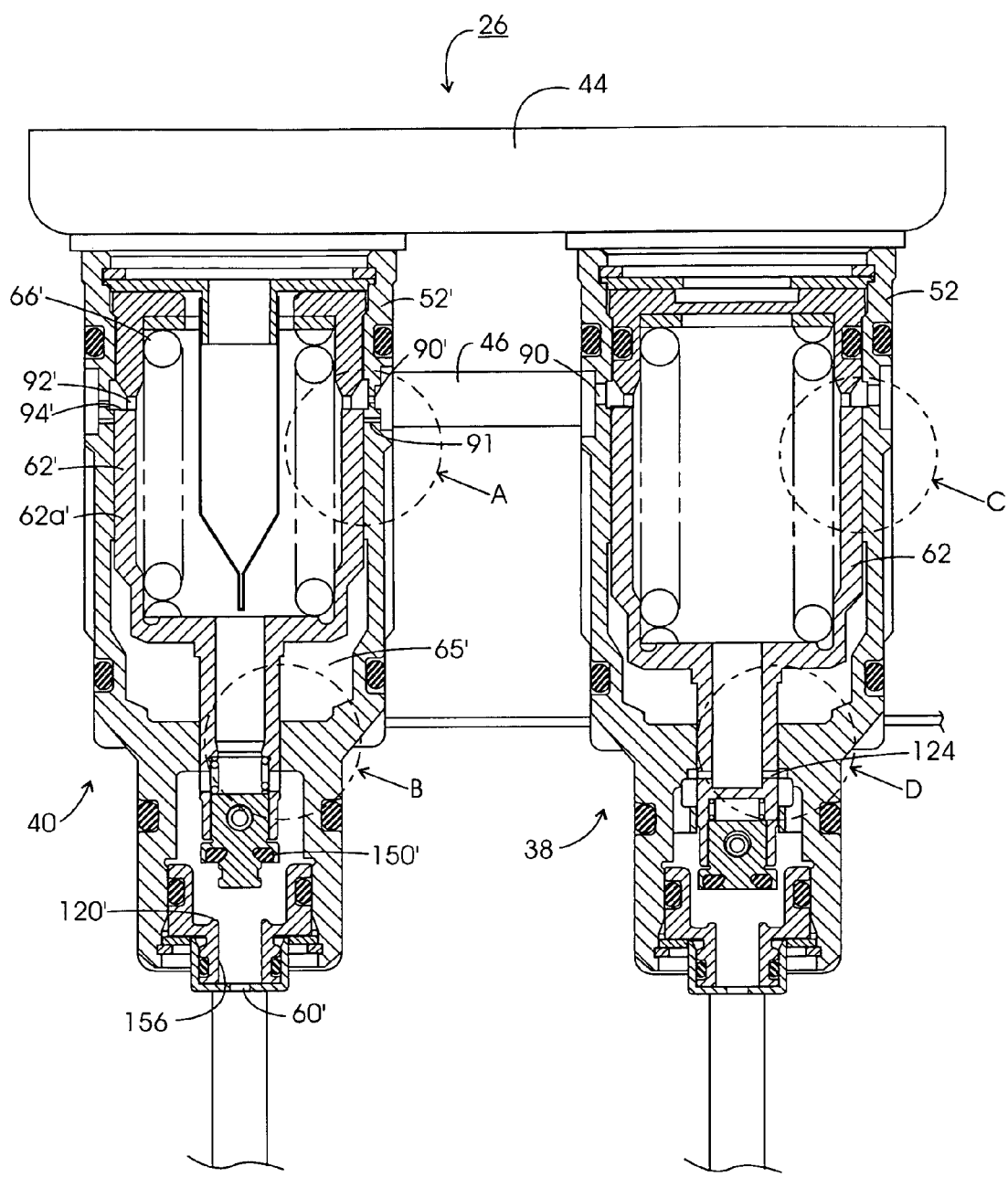
Figure 13A:
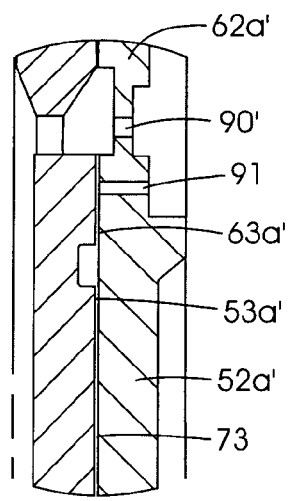
FIGS. 13a and 13b show enlarged portions of the circled areas A and B, of the main valve of FIG. 12, which detail the main signal to supply fluid leakage paths.
Figure 13C:
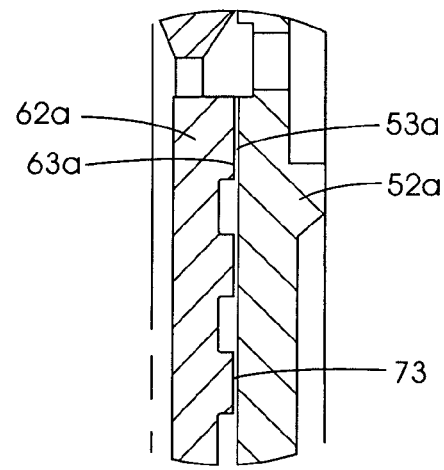
FIGS. 13c and 13d show enlarged portions of the circled areas C and D, of the pilot valve of FIG. 12, which detail the pilot signal to supply fluid leakage paths.
Figure 13B:
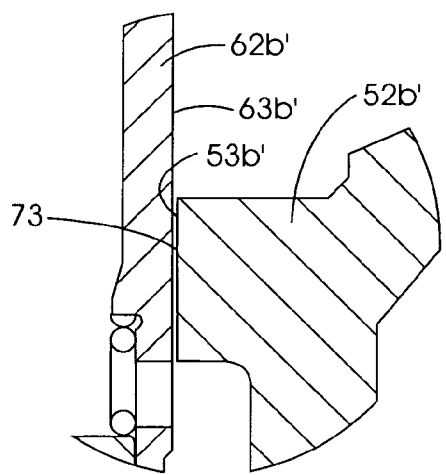
Figure 13D:
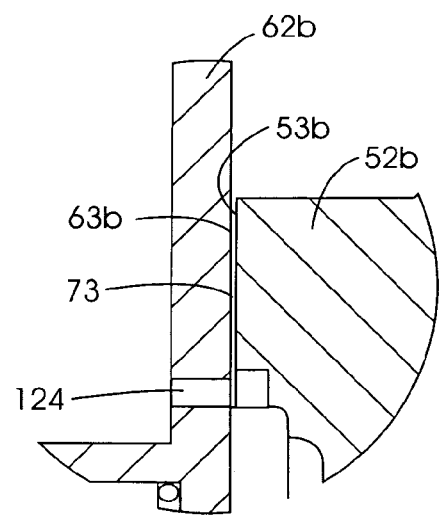

Arriving at position 4 operation in FIG. 12, while a yet further increase in the predetermined pressure of the signal fluid has no additional influence on pilot spool 62 since it already bottomed out in position 2, this fourth predetermined amount of signal fluid pressure which also enters main valve cavity 65' now further compresses main valve spring 66' for a third predetermined distance thereby causing further axial movement of main valve spool portion 62' until upper annular surface 94' of spool portion 62a' abuts or bottoms out on spring retainer lower end portion 92. This movement also passes over and covers or blocks main sleeve orifice 91 (with sleeve orifice 90' still remaining open) thereby throttling the passage of pressurized fluid from main cavity 78' pilot cavity 78 via pilot supply conduit 46.

In position 4 operation, fuel flow also proceeds through aperture 90' and continues via pilot supply conduit 46, through pilot valve 38 and into combustion chamber 22. The fuel leakage around pilot valve spool 62 flows into pilot valve inner cavity 78 and then through pilot orifice 60 into combustion chamber 22, via the pilot injection circuit. The fuel leakage around main valve spool 62' will flow either directly into the main fuel circuit, via clearance 63b', or into the pilot and main fuel circuits, via clearance 63a'.

Figure 8:
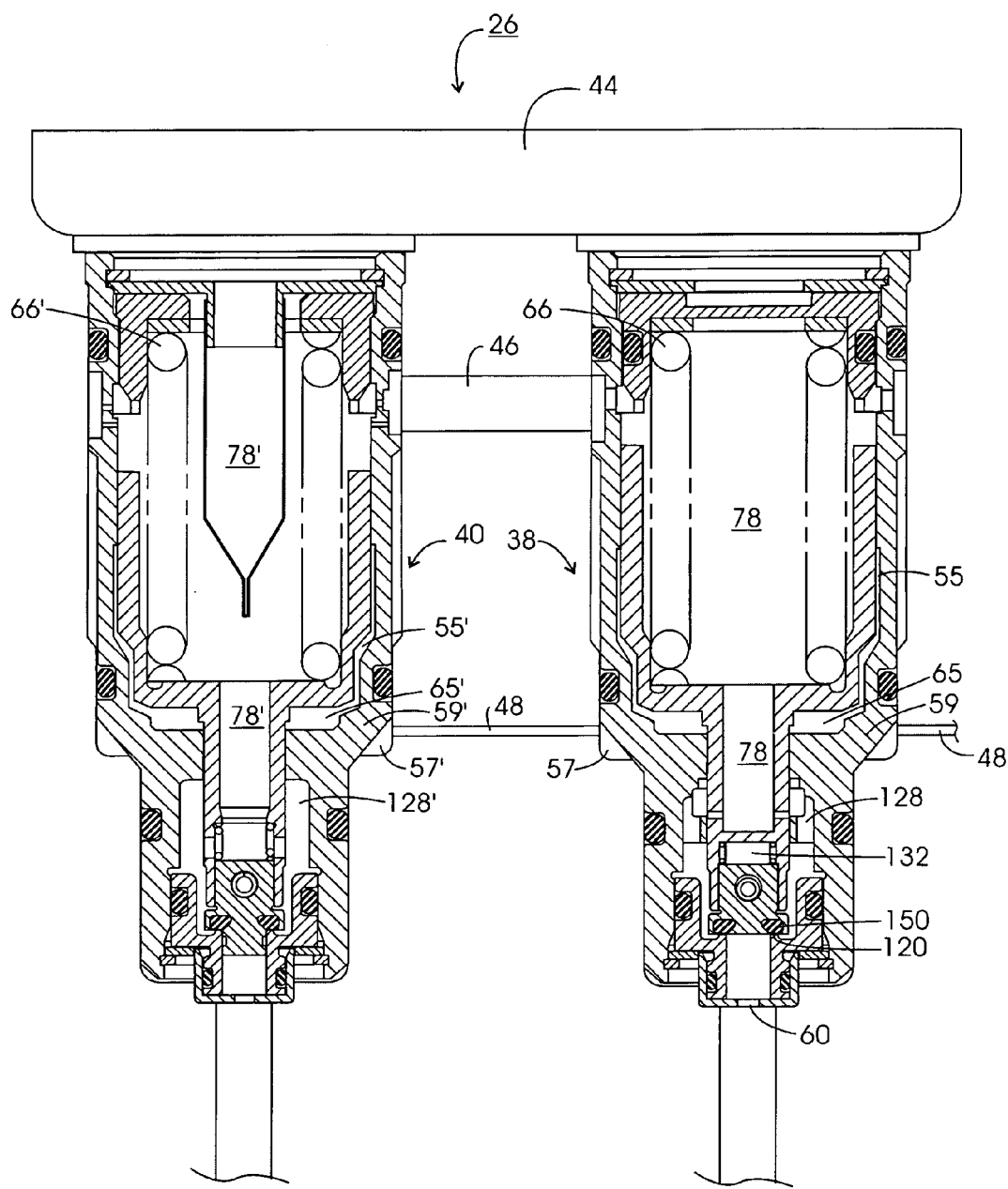
FIGS. 8 to 12 show the fuel staging valve assembly of FIG. 3 in shut-down, positions 1, position 2, position 3 and position 4, respectively.

While the progression of the movements of pilot valve seal 150 can readily be seen by a perusal of the changing positions of valve seal 150, relative to valve seat 120, in FIGS. 8 to 10, the progression of movements of main valve seal 150' is best seen by a perusal of the changing positions of valve seal 150', relative to valve seat 120', in FIGS. 9 to 12.

Another way to look at the noted progression of the valving action of main valve 40 is to view, in FIG. 5, the progressive location of the line 171, depicting the intersection of poppet relief band 170 and poppet second band 166, wherein the points M1, M2, M3 and M4 represent the progressive locations of line 171 in main valve 40, corresponding to positions 1–4 in FIGS. 9–12, respectively.

In the preceding description, the fuel flow division or fuel ratio delivery, within gas turbine engine 26, through the recited positions 1 to 4, for the one pilot valve 38 and the one main valve 40, occurs as noted. However, as known by those skilled in the art, the amount of fuel mass flow is usually determined by a separate hydromechanical or electronic fuel metering unit that is not shown here. A typical, known, unit of this type uses engine revolutions per minute along with other parameters, such as throttle position, air temperature and pressure, etc., to determine the required fuel mass flow rate. Staging valves 30 then take this amount of fuel and determine the amount of fuel that will flow to the previously-described zones, for example a pilot and main zone. Since future engines may well require more than two such zones, additional zones, such as three or four zones per nozzle, may necessitate using more main valves, as the fuel mass flow rate increases, fuel pressure increases in the feed manifold, if operation were restricted solely to position 1 and the engine could only accelerate to part power. When position 2 is selected, the fluid pressure then experiences a stepped reduction and the engine continues to accelerate. The fuel mass flow rate then increases linearly from low to high on takeoff and the fuel pressure first ramps up and then rapidly decreases to an intermediate level, in position 2, position 3, etc. An approximate analogy can be made with reference to an automatic transmission in an automobile in that the power or torque, produced by the engine, remains the same but the transmission shifts sequentially to additional ratios in order to permit higher and higher road speeds.

Again, it will be understood by those skilled in the art that this invention is not limited to the fuel divisions or fuel ratio deliveries, previously described with reference to positions 1 to 4. For example, the position 1–4 splits can be changed, in one manner, by varying the sizes and/or clearances of one or more of the recited pilot and main valve restrictions, such as, e.g., 60, 60', 90' 90' 91 and 172. In addition, the spring rates of valve springs 66 and 66' will determine the level of the signal pressure that is required to activate a given position. In this example, the position 4 split is controlled by the size of orifice 90', in main valve 40, e.g., if its diametral size is reduced, less fluid flow will be delivered to pilot valve 38 during position 4 operation.

Figure 14:
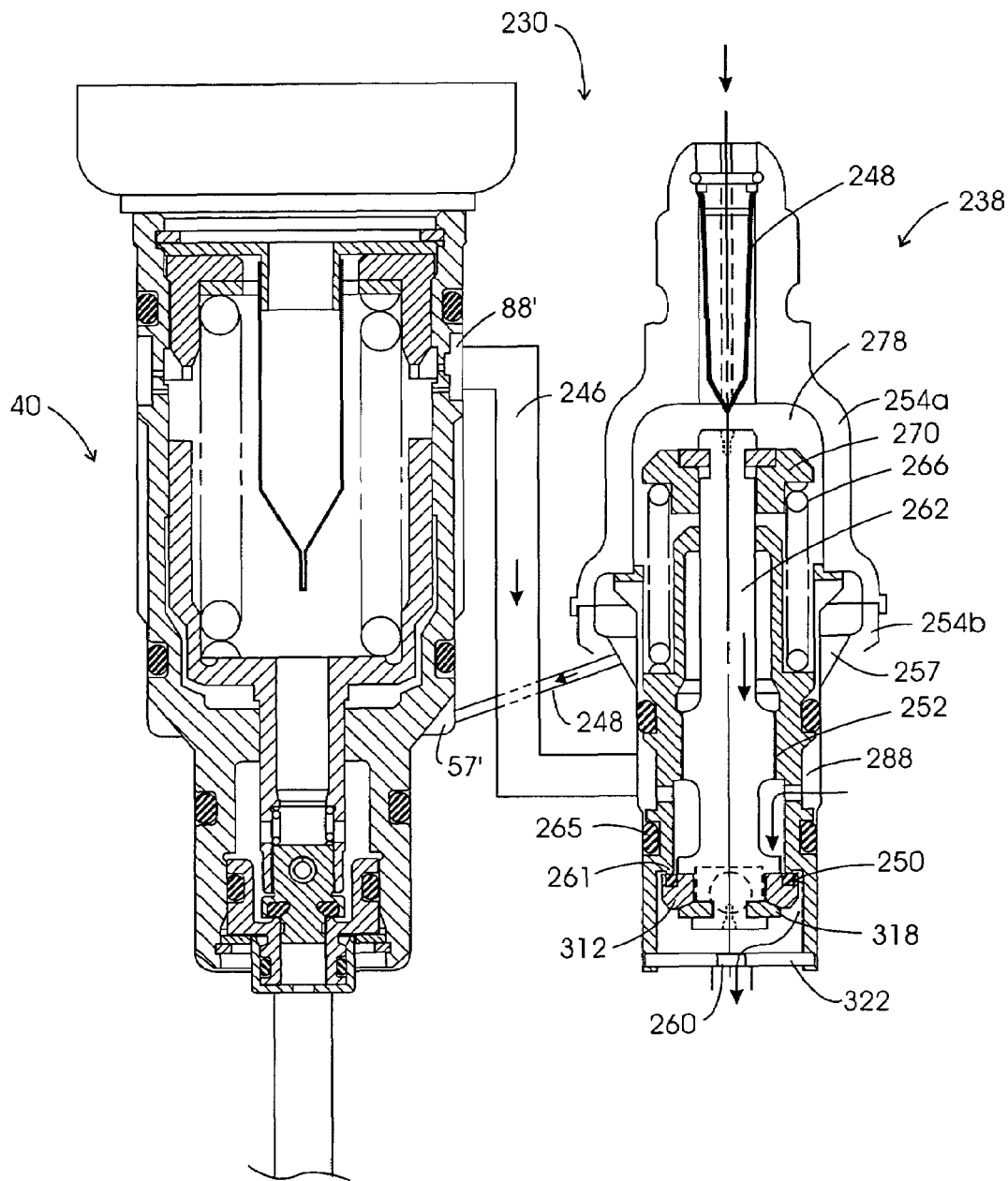
FIG. 14 is a vertical sectional view of another embodiment of the fuel staging valve assemblies of this invention, comprised of interconnected pilot and main valves.
Figure 15:
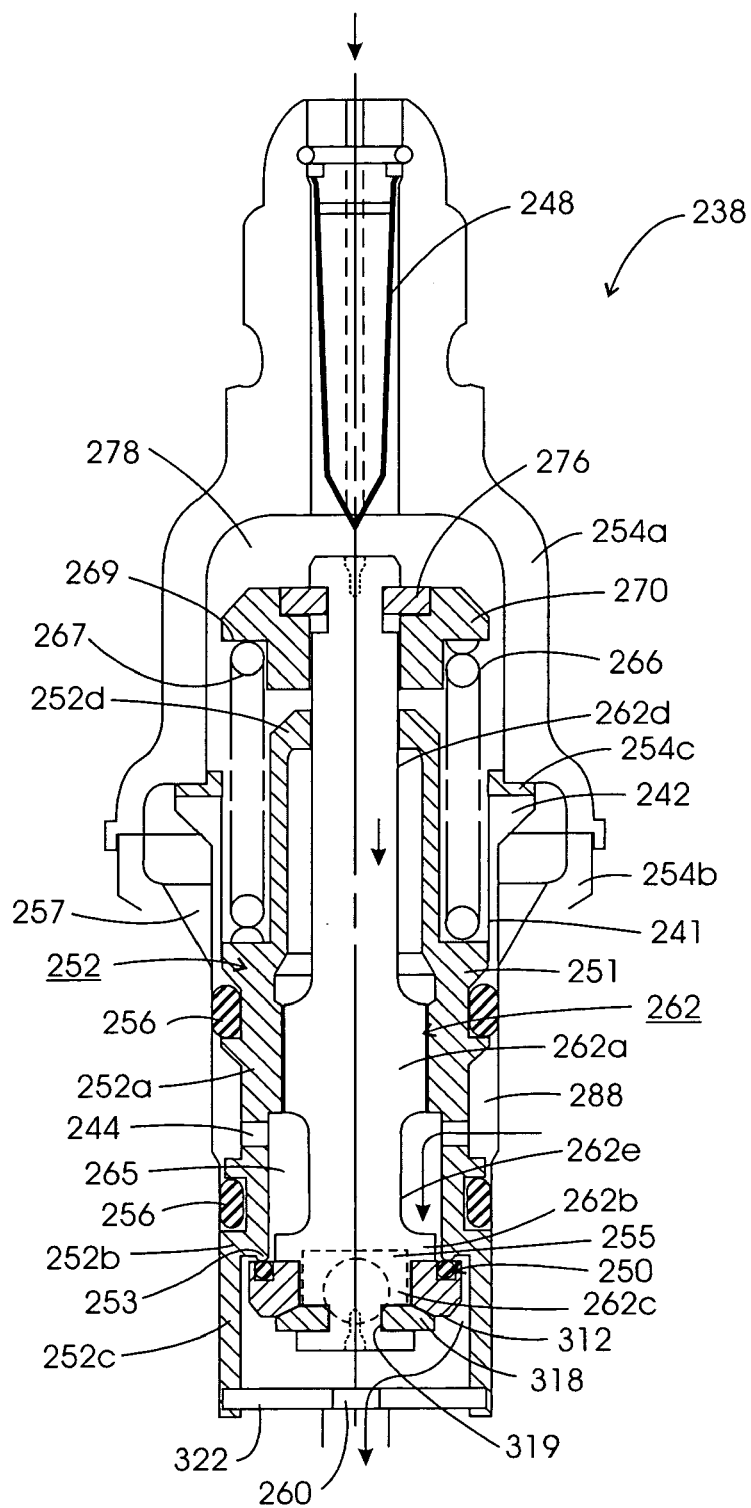
FIG. 15 is an enlargement of the pilot valve of FIG. 14.

Turning now to FIG. 14, it represents a simplified vertical sectional view of another embodiment 230 of the fuel staging valve assembly of this invention which is comprised of previously-described main or secondary valve 40, operatively interconnected with a simplified pilot or prime valve 238. As best seen in FIG. 15, which depicts an enlargement of valve 238, it has a multiple diameter, hollow, generally cylindrical sleeve 252 sealingly received, via sealing members 256, within an adjoining or conforming split housing portion 254a, 254b (not fully detailed here), with housing portion 254a including a fluid signal pressure input port 248 connected with a valve central cavity 278 and adapted to be connected to a source of such fluid signal pressure. A multiple diameter cylindrical valve spool 262, having spaced and differing diameter land areas 262a, 262b, 262c and reduced diameter areas 262d and 262e, is slidably and conformingly received within sleeve 252, with areas 262a, 262b, and 262d being slidingly adjacent to sleeve conforming areas 252a, 252b, and 252d, respectively.

The juncture of sleeve portions 252a, 252b occurs at a radial stepped annular intermediate portion 251 which serves as an inner support portion for one end of a valve spring 266 whose other end abuts an annular stepped portion 269 of an annular spring retainer 270 which in turn is slidably restrained via a removable retaining ring 276 located in an elongated longitudinal groove 267 in spool portion 262d. The juncture of sleeve portions 252b and 252c occurs at a radial stepped intermediate land portion 253 which terminates at an inner edge portion 255 that serves as a seal seat for a pilot seal member 250, such as an O-ring, interposed between spool portion 262b and a centrally apertured cup-shaped valve seat retention member 312. Member 312, in turn, is held in place via a stop retainer ring or washer 318 located in a groove 319 of spool portion 262c. It should be evident that the longitudinal portion of member 312 also serves to limit the compression of pilot seal member 250 relative to land edge portion 255. A closure member 322, having a central pilot orifice 260, closes off sleeve portion 252c.

Between sleeve land portion 252a and its adjacent housing portion 254b there is provided a recessed, elongated annular gland area 288 which communicates with an annular pilot cavity 265 at sleeve recessed area 262e, via a plurality of spaced lateral apertures or bores 244 in sleeve portion 252a. As best seen in FIG. 14, pilot cavity 265 is operatively connected with main valve cavity 88' via a fluid pilot supply conduit 246.

Surrounding a lower portion of valve spring 266 and attached to intermediate portion 251 and movable therewith is one end of a generally cylindrical blocking member 241. The annular other end 242 of blocking member 241 is sealingly received against an annular step portion 254c in housing 254a, under certain operating conditions of valve 238, but which under other operating conditions permits communication between an adjacent peripheral land cavity 257 and central valve cavity 278. Valve cavity 257 is located in the vicinity of the junction of housing members 254a, 254b, and bounded by blocking member 241, with cavity 257 being operatively interconnected, via fluid signal pressure conduit 248, with main valve peripheral land cavity 57.

In terms of the operation of staging valve 230, comprised of previously-described main valve 40 and simplified pilot valve 238, FIG. 14 illustrates staging valve 230 in a shutdown position, similar to that shown in FIG. 8 for previously-described staging valve 30. The operation in positions 1 to 4 of staging valve 230 follows, in principle, the operation of noted staging valve 30.

Even though the detailed operation of the structure of pilot valve 238 differs somewhat from that of pilot valve 38, these differences are deemed to be readily ascertainable by those skilled in the art and will thus, in the interest of brevity, not be described in further detail. The functionality of pilot valve 238 is substantially similar to that of previously-described pilot valve 38. However, pilot valve 238 has reduced pressure leakage and is lighter in weight.

Some of the advantages over the known prior art afforded by the present invention are as follows:

1. The dual diameter construction of valve spools 62, 62' permits the desired spool stroke direction, relative to their respective sleeves 52, 52' with signal high pressure, via the separate signal circuit that includes lines 48 and peripheral housing land cavities 57, 57' as well as spool cavities 65, 65', together with land cavities 57, 57'. If desired this construction could also be altered so as to utilize low signal pressure. For this, the ratio of the main fuel feed to signal pressure areas would be reversed.

2. All moving parts of valves 38, 40 are located upstream of valve seats 120, 120' and thereby protected from combustion products during staging valve operation.

3. Low fuel volume, downstream of valve seats 120, 120', reduces circuit fluid fill and drain times.

4. Spool valve springs 66, 66' preload spools 62, 62' against valve sleeves 52, 52' at ledges 80, 80'.

5. Washers/shims 114, 114' are sized to set up initial sealing loads on soft or resilient seals 150, 150', relative to contoured valve seat portions 120, 120', against the facing or downstream portions of retainer pins 138, 138', thereby preventing leaks at low fluid supply pressure.

6. At higher supply pressures, the loading of poppet seals 150, 150', against seal seats 120, 120', increases due to the fluid pressure differential from supply pressure plenum 44 to discharge apertures 60, 60'. This loading, maintains "no leak" seals 150, 150' at high fluid supply pressures.

7. Elastic seals 150, 150' are preferably comprised of a stiff, elastomeric, composition that is bonded, molded or cast-in-place and have a contoured locked-in profile (in cross section) so as to prevent displacement thereof at high fluid pressure drops.

8. Gaps 139, 139', between pins 138, 138' and poppet apertures 140, 140' and gaps 151, 151', between seal outer surfaces 152, 152' and valve retainer radial surface portions 16, 116', serve to limit the compression of seals 150, 150' and allow compensation for seal compression set. Poppet springs 144, 144' maintain the contact of seals 150, 150' with seal seats 120, 120' even during seal compression set. Specifically, gaps 139, 139' limit the compression forces acting on seals 150, 150' since any excess forces, upon the closures of gaps 139, 139', are taken up by the upstream-facing portions of pins 138, 138'.

9. Pilot valve 138 opens when the fluid signal pressure, entering valve cavity 65 from signal pressure conduit 48 and land cavity 57 via sleeve aperture 59, overcomes the loading of valve spring 66 and poppet spring 144, at poppet seal seat 120, with the poppet seal force diameter being that of cavity 156.

10. Actuation of main valve spool 62', relative to sleeve aperture 91, modulates pilot circuit flow, with valve spool 62' blocking orifice 91 which thus reduces the flow area leading to pilot valve 38.

11. During valve operation, by permitting a predetermined, controlled, amount of fluid leakage between valve sleeves 52, 52' and valve spools 62, 62', the need for dynamic seals, such as O-rings, with their attendant hysteresis and aging problems, is obviated.

12. Other advantages include reduced size and weight of the valve systems, both of which are particularly beneficial in aircraft applications.

While there are shown and described several presently preferred embodiments of the staging valve assemblies of this invention, it is to be distinctly understood that the invention is not limited thereto, but may be otherwise variously embodied and practiced within the scope of the following claims.

What is claimed is:

1. A fuel staging valve assembly, for distributing fuel flow to a multiple zone nozzle in a gas turbine engine, comprised of a pilot valve operatively interconnected with at least one main valve, said at least one main valve comprising:

a. a dual diameter valve housing;

b. a dual diameter cylindrical valve sleeve fixedly, sealingly and conformably received within said valve housing, said sleeve having a first diameter portion and a second diameter portion joined via an intermediate annular portion, with a peripheral land cavity being located between said sleeve intermediate portion and an adjacent portion of said valve housing; and said first diameter portion having a peripheral, recessed, annular gland area with axially spaced first and second pluralities of discrete radial passages therethrough;

c. a dual diameter hollow cylindrical valve spool, having a central cavity in communication with a source of fuel, conformably and slidably received within said cylindrical valve sleeve, said spool having a first diameter portion and a second diameter portion joined via an intermediate annular portion, with predetermined diametral clearance spaces being provided between corresponding adjoining first and second diameter portions of said sleeve and spool, thereby permitting a predetermined amount of fluid leakage therebetween, during operation of said pilot poppet valve; and an annular pressure signal cavity, interconnected with said land cavity, being located between intermediate annular portions of said valve sleeve and said valve spool;

d. a centrally apertured spring retainer fixedly received within said sleeve first diameter portion and closing one end thereof;

e. a main valve spring, interposed between said spring retainer and said spool intermediate annular portion, for preloading said spool against said sleeve;

f. a centrally-apertured dual diameter valve seat retainer member having a first diameter portion and a second diameter portion joined via an intermediate radial surface portion, said retainer member first diameter portion being fixedly and sealingly received within an open end of said sleeve second diameter portion, with said retainer member intermediate radial surface portion being provided with an inwardly-directed, raised, central contoured seal seat portion adjoining said retainer member second diameter portion;

g. a generally cup-shaped closure member is fixedly and sealingly received on said retainer member second diameter portion and includes a central main valve discharge orifice adapted to be operatively interconnected with said nozzle;

h. a multiple diameter poppet member having interconnected first, second and third diameter portions, said first diameter portion being yieldingly, slidably received within an open end of said valve spool second diameter portion, with the axial movement of said poppet member being restricted via a split retaining roll pin press-fitted relative to said valve spool second diameter portion but having a predetermined peripheral clearance relative to said poppet member;

i. a poppet spring, operatively interposed between said poppet member and a peripheral internal wall portion in said spool member second diameter portion, for axially biasing said poppet member toward said contoured seal seat portion, with said biasing being limited via said predetermined axial clearance, relative to said roll pin;

j. a stiff, elastic, annular seal member, contoured in cross-section, fixedly retained within a mating contoured recess within said poppet member second diameter portion, having an axial outer surface adapted to sealingly mate with said raised valve seat portion of said valve seat retainer member, with said third diameter portion of said poppet member, in an at-rest position, axially extending, beyond said seal member axial outer surface and in the vicinity of said seal seat portion, with at least one predetermined diametral clearance, into said retainer member second diameter portion; and k. a shim, fixedly abutting and acting on said retainer member intermediate radial surface portion, provides an initial, predetermined sealing force, relative to said seal member axial outer surface, against said retaining roll pin, thereby preventing fuel leaks at low fluid supply pressure, with said predetermined peripheral clearance, relative to said poppet member serving to limit the compression of said elastic seal member as well as allowing compensating for any seal compression set.

2. The fuel staging valve assembly of claim 1, wherein said axial outer surface of said elastic, annular seal member is one of being generally flattened, contoured, stepped and relieved, via surface finishing, after being fixedly retained within said recess.

3. The fuel staging valve assembly of claim 1, wherein said elastic, annular seal member is fixedly retained within a matingly contoured annular recess located in said poppet member second diameter portion, said seal member being one of bonded, molded-in-place and cast-in-place.

4. The fuel staging valve assembly of claim 3, wherein at least one of said contoured recess and seal member has, in cross-section, an at least partial dovetail shape.

5. The fuel staging valve assembly of claim 1, wherein said elastic, annular seal member is comprised of a stiff rubber-based composition having an approximate 90 durometer hardness.

6. The fuel staging valve assembly of claim 1, wherein said contoured valve seat portion is one of gradually tapering, semicircular and of a double inwardly-tapering shape.

7. The fuel staging valve assembly of claim 1, wherein said predetermined diametral clearance spaces between said corresponding first and second diameter portions of said valve sleeve and valve spool are located in at least one of the mutually adjoining sleeve inner wall and spool outer wall surfaces.

8. The fuel staging valve assembly of claim 7, wherein said diametral clearance spaces function as predetermined, controlled, leakage paths through which a high pressure signal fluid can flow, via a fluid signal pressure conduit connected with said peripheral land cavity, from said high pressure signal cavity to adjoining areas of lower pressure between said valve sleeve and said valve spool via at least one further intermediate aperture and said diametral clearance spaces.

9. The fuel staging valve assembly of claim 8, wherein the percentage of fluid leakage is below about 2 percent of the total fluid flow within said assembly.

10. The fuel staging valve assembly of claim 1, wherein all axially movable components of said main valve are located upstream of said valve seat retainer member, in a direction opposite to the flow of fuel exiting from said discharge orifice, said axially movable components thereby being protected from combustion products produced during operation of said gas turbine engine.

11. The fuel staging valve assembly of claim 10, wherein said axially movable components include said valve spool, said main valve spring, said poppet member, said poppet spring and said seal member.

12. The fuel staging valve assembly of claim 1, wherein said main valve centrally apertured spring retainer includes an inner annular end portion, having a plurality of spaced radial passages, at a location generally radially inwardly of said annular gland area, said retainer annular end portion, during certain predetermined operating positions of said staging valve assembly, being axially spaced differing distances, relative to said main valve spool.

13. The fuel staging valve assembly of claim 12, wherein during at least one of said certain predetermined operating positions of said staging valve assembly, one of said axially spaced first and second pluralities of discrete radial passages is blocked by said main valve spool first diametral portion.

14. The fuel staging valve of claim 1, further including a fluid inlet plate, having a central cylindrical portion extending through said centrally apertured spring retainer into said cylindrical cavity, said fluid inlet plate being interposed between said spring retainer and a retaining ring in said main valve sleeve first cylindrical portion, said inlet plate cylindrical portion serving as an inlet for said fuel into said main valve.

15. The fuel staging valve of claim 14, further including a fuel strainer having a closed end and an open end, said open end being affixed to said inlet plate cylindrical portion, said fuel strainer extending into the central interior cavity of said main valve.

16. The fuel staging valve assembly of claim 1, said pilot valve comprising:
  a. a dual diameter valve housing;
  b. a dual diameter cylindrical valve sleeve fixedly, sealingly and conformably received within said valve housing, said valve sleeve having a first diameter portion and a second diameter portion joined via an intermediate annular portion, with a peripheral land cavity being located between said sleeve intermediate portion and an adjacent portion of said valve housing; and said first diameter portion having a peripheral, recessed, annular gland area with a plurality of discrete radial passages therethrough;
  c. a dual diameter hollow cylindrical valve spool, having a central cavity, conformably and slidably received within said cylindrical valve sleeve, said spool having a first diameter portion and a second diameter portion joined via an intermediate annular portion, with predetermined diametral clearance spaces being provided between corresponding adjoining first and second diameter portions of said sleeve and spool, thereby permitting a predetermined amount of fluid leakage therebetween, during operation of said pilot poppet valve; and an annular pressure signal cavity, interconnected with said land cavity, being located between annular portions of said valve sleeve and said valve spool;
  d. a spring retainer fixedly and sealingly received within said sleeve first diameter portion and closing one end thereof;
  e. a pilot valve spring, interposed between said spring retainer and said spool intermediate annular portion, for preloading said spool against said sleeve;
  f. a centrally-apertured dual diameter valve seat retainer member having a first diameter portion and a second diameter portion joined via an intermediate radial surface portion, said retainer member first diameter portion being fixedly and sealingly received within an open end of said sleeve second diameter portion, with said retainer member intermediate radial surface portion being provided with an inwardly-directed, raised, central contoured seal seat portion adjoining said retainer member second diameter portion;
  g. a generally cup-shaped closure member is fixedly and sealingly received on said retainer member second diameter portion and includes a central pilot valve discharge orifice adapted to be operatively interconnected with said nozzle;
  h. a dual diameter poppet member having a first diameter portion and a second diameter portion, said first diameter portion being yieldingly, slidably received within an open end of said valve spool second diameter portion, with the axial movement of said poppet member being restricted via a split retaining roll pin pressfitted relative to said valve spool second diameter portion but having a predetermined peripheral clearance relative to said poppet member;
  i. a poppet spring, operatively interposed between said poppet member and a peripheral internal wall portion in said spool member second diameter portion, for axially biasing said poppet member toward said contoured seal seat portion, with said biasing being limited via said predetermined axial clearance, relative to said roll pin;
  j. a stiff, elastic, annular seal member, contoured in cross-section, fixedly retained within a mating contoured recess within said poppet member second diameter portion, having an axial outer surface adapted to sealingly mate with said raised valve seat portion of said valve seat retainer member; and
  k. a shim, fixedly abutting and acting on said retainer member intermediate radial surface portion, provides an initial, predetermined sealing force, relative to said seal member axial outer surface, against said retaining roll pin, thereby preventing fuel leaks at low fluid supply pressure, with said predetermined peripheral clearance, relative to said poppet member serving to limit the compression of said elastic seal member as well as allowing compensating for any seal compression set.

17. The fuel staging valve assembly of claim 16, wherein said axial outer surface of said elastic, annular seal member is one of being generally flattened, contoured, stepped and relieved, via surface finishing, after being fixedly retained within said recess.

18. The fuel staging valve assembly of claim 16, wherein said elastic, annular seal member is fixedly retained within a matingly contoured annular recess located in said poppet member second diameter portion, said seal member being one of bonded, molded-in-place and cast-in-place.

19. The fuel staging valve assembly of claim 18, wherein at least one of said contoured recess and said seal member has, in cross section, an at least partial dovetail shape.

20. The fuel staging valve assembly of claim 16, wherein said elastic, annular seal member is comprised of a stiff rubber-based composition having an approximate 90 durometer hardness.

21. The fuel staging valve assembly of claim 16, wherein said contoured valve seat portion is one of gradually tapering, semicircular and of a double inwardly-tapering shape.

22. The fuel staging valve assembly of claim 16, wherein said predetermined diametral clearance spaces between said corresponding first and second diameter portions of said valve sleeve and valve spool are located in at least one of the mutually adjoining sleeve inner wall and spool outer wall surfaces.

23. The fuel staging assembly of claim 22, wherein said diametral clearance spaces function as predetermined, controlled, leakage paths through which a high pressure signal fluid can flow, via a fluid signal pressure conduit connected with said peripheral land cavity, from said high pressure signal cavity to adjoining areas of lower pressure between said valve sleeve and said valve spool via at least one further intermediate aperture and said diametral clearance spaces.

24. The fuel staging valve assembly of claim 23, wherein the percentage of fluid leakage is below about 2 percent of the total fluid flow within said assembly.

25. The fuel staging valve assembly of claim 16, wherein all axially movable components of said pilot valve are physically located upstream of said valve seat retainer member, in a direction opposite to the direction of the flow of fuel exiting from said discharge orifice, said axially movable components thereby being protected from combustion products produced during operation of said gas turbine engine.

26. The fuel staging valve assembly of claim 25, wherein said axially movable components include said valve spool, said pilot valve spring, said poppet member, said poppet spring and said seal member.

27. The fuel staging valve assembly of claim 16, wherein said pilot valve spring retainer includes an inner annular end portion, having a plurality of spaced radial passages, said retainer annular end portion, during certain predetermined operating positions of said staging valve assembly, being axially spaced relative to said pilot valve spool, while during other predetermined ones of such operating positions functioning as an outer axial stop member for said pilot valve spool.

28. The fuel staging valve assembly of claim 16, further including a fluid pilot supply conduit interconnecting said pilot and main valve spool central cavities at their respective valve gland areas; and a source of fluid signal pressure, connected with said pilot valve peripheral land cavity, and a fluid pressure signal conduit, interconnecting said pilot and main valves at their respective peripheral land cavities, for supplying said fluid signal pressure to said main valve.

29. In a gas turbine engine, a fuel staging valve assembly, for distributing fuel flow to a multiple zone nozzle therein, comprised of a pilot valve operatively interconnected with at least one main valve, each of said valves including:
  a. a dual diameter valve housing;
  b. a dual diameter cylindrical valve sleeve fixedly, sealingly and conformably received within said valve housing, said sleeve having a first diameter portion and a second diameter portion joined via an intermediate annular portion, with a peripheral land cavity being located between sleeve intermediate portion and an adjacent portion of said valve housing; and said first diameter portion having a peripheral, recessed, annular gland area with at least an axially spaced first plurality of discrete radial passages therethrough;
  c. a dual diameter hollow cylindrical valve spool, having a central cavity, conformably and slidably received within said cylindrical valve sleeve, said spool having a first diameter portion and a second diameter portion joined via an intermediate annular portion, with predetermined diametral clearance spaces being provided between corresponding adjoining first and second diameter portions of said sleeve and spool, thereby permitting a predetermined amount of fluid leakage therebetween, during operation of said pilot poppet valve; and an annular pressure signal cavity, interconnected with said land cavity, being located between intermediate annular portions of said valve sleeve and said valve spool;
  d. a centrally apertured spring retainer fixedly received within said sleeve first diameter portion and closing one end thereof;
  e. a valve spring, interposed between said spring retainer and said spool intermediate annular portion, for pre-loading said spool against said sleeve;
  f. a centrally-apertured dual diameter valve seat retainer member having a first diameter portion and a second diameter portion joined via an intermediate radial surface portion, said retainer member first diameter portion being fixedly and sealingly received within an open end of said sleeve second diameter portion, with said retainer member intermediate radial surface portion being provided with an inwardly-directed, raised, central contoured seal seat portion adjoining said retainer member second diameter portion;
  g. a generally cup-shaped closure member is fixedly and sealingly received on said retainer member second diameter portion and includes a central main valve discharge orifice;
  h. a multiple diameter poppet member having interconnected first and second diameter portions;
  i. a poppet spring, operatively interposed between said poppet member and a peripheral internal wall portion in said spool member second diameter portion;
  j. a stiff, elastic, annular seal member, contoured in cross-section, fixedly retained within a mating contoured recess within said poppet member second diameter portion, having an axial outer surface adapted to sealingly mate with said raised valve seat portion of said valve seat retainer member;
  k. a shim, fixedly abutting and acting on said retainer member intermediate radial surface portion;
  l. a fluid pilot supply conduit interconnecting said pilot and main valve central cavities at their respective gland areas;
  m. a source of fluid signal pressure connected with said pilot valve peripheral land cavity; and
  n. a fluid pressure signal conduit interconnecting said pilot and main valves at their respective peripheral land cavities, wherein the improvement comprises:
  o. said poppet member first diameter portion being yieldingly, slidably, received within an open end of said valve spool second diameter potion, with the axial movement of said poppet being restricted via a split retaining roll pin press-fitted relative to said valve spool second diameter portion but having a predetermined clearance relative to said poppet member;
  p. said poppet spring axially biasing said poppet member toward said contoured seal seat portion, with said biasing being limited via said predetermined axial clearance, relative to said pin; and
  q. said shim providing an initial, predetermined, sealing force, relative to said seal member axial outer surface, against said retaining roll pin, thereby preventing fuel leaks at low fluid supply pressure, with said predetermined peripheral clearance, relative to said poppet member serving to limit the compression of said elastic member as well as allowing compensation for any seal compression set.

30. The improved fuel staging valve assembly of claim 29, wherein:
  a. said elastic, annular, seal member is fixedly retained within a matingly contoured annular recess located in said poppet member second diameter portion, said seal member being one of bonded, molded-in-place and cast-in-place; and
  b. said axial outer surface of said elastic, annular, seal member is one of being generally flattened, contoured, stepped and relieved, via surface finishing, after being fixedly retained within said recess.

31. The improved fuel staging valve assembly of claim 29, wherein:
  a. said elastic, annular, seal member is comprised of a stiff rubber-based composition having an approximate 90 durometer hardness;

b. at least one of said contoured recess and seal member has, in cross-section, an at least partial dovetail shape; and c. said contoured valve seat portion is one of gradually tapering, substantially semicircular and of a double-inwardly tapering shape.

32. The improved fuel staging valve assembly of claim 29, wherein said predetermined diametral clearance spaces between said corresponding first and second diameter portions of said valve sleeve are located in at least one of the mutually-adjoining sleeve inner wall and spool outer wall surfaces.

33. The improved fuel staging valve assemblies of claim 32, wherein said diametral clearance spaces function as predetermined, controlled leakage paths through which the high pressure signal fluid can flow, from said high pressure signal cavity to adjoining areas of lower pressure between said valve sleeve and said valve spool via at least one further intermediate aperture and said diametral clearance spaces.

34. The improved fuel staging valve assembly of claim 33, wherein the percentage of fluid leakage is below about 2% of the total fluid flow within said assembly.

35. The improved fuel staging valve assembly of claim 29 wherein all axially movable components of said valves are located upstream of said valve seat retainer member, in a direction opposite to the flow of fuel exiting from said discharge orifices, said axially slidable components thereby being protected from combustion products produced during operation of said gas turbine engine.

36. The improved fuel staging valve assembly of claim 35, wherein said axially movable components include said valve spools, said main springs, said poppet members, said poppet springs and said seal members.

37. The fuel staging valve assembly of claim 29, said pilot valve comprising:

a. a multiple diameter valve housing having a central cavity and a fluid signal pressure input port extending into said cavity;

b. a multiple diameter cylindrical valve sleeve, said sleeve having multiple differing diameter sleeve portions, with one of said differing diameter sleeve portions having a peripheral, recessed, annular gland area with a plurality of discrete radial passages extending therethrough; and an intersection of two adjacent ones of said sleeve differing diameter portions serving as a seal seat portion;

c. a multiple diameter cylindrical spool conformably and slidably received within said cylindrical valve sleeve, said spool having multiple differing diameter spool portions;

d. a spring retainer slidably fixedly received on one of said spool differing diameter portions;

e. a pilot valve spring, interposed between said spring retainer and another of said valve spool differing diameter portions;

f. a generally cup-shaped, centrally apertured, valve seal retention member fixedly retained on another one of said valve spool differing diameter portions;

g. a generally cylindrical blocking member having one end attached to and movable with said another one of said sleeve differing diameter portions, with another end of said blocking member being sealingly received against a step portion of said valve housing under certain predetermined valve operating conditions while permitting communication between said housing central cavity and a peripheral land cavity located between said blocking member and said housing;

h. a stiff, elastic, annular seal member fixedly retained within said valve seal retention member, with a peripheral longitudinal portion of said retention member limiting the degree of compression of said seal member;

i. a shim, fixedly abutting and acting upon said valve seal retention member, provides an initial, predetermined, sealing force, relative to said seal member, against said valve seal seat portion; and j. a centrally apertured disc closure member, attached to an exit portion of one of said two adjacent ones of said sleeve differing diameter portions, and including a central pilot valve discharge orifice.

38. The fuel staging valve assembly of claim 37, further including a fluid pilot supply conduit interconnecting said pilot and main valve peripheral land cavities; and a source of fluid signal pressure, connected with said pilot valve central cavity, and a fluid pressure signal conduit, interconnecting said pilot and main valves at their respective valve gland areas, for supplying said fluid signal pressure to said main valve.

* * * * *